(12) United States Patent
Allen et al.

(10) Patent No.: US 6,185,039 B1
(45) Date of Patent: *Feb. 6, 2001

(54) INFRARED SELECTIVE REFLECTIVE POLARIZING ELEMENT

(75) Inventors: Richard C. Allen, Mendota Heights; Gregg A. Hietpas, St. Paul; Jon E. Stickrod, Oakdale; John A Wheatley, Lake Elmo, all of MN (US)

(73) Assignee: 3M Innovative Properties Co., St. Paul, MN (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/333,614

(22) Filed: Jun. 15, 1999

Related U.S. Application Data

(63) Continuation of application No. 08/986,281, filed on Dec. 6, 1997, now Pat. No. 5,999,316.

(51) Int. Cl.[7] .................................................. G02B 5/50
(52) U.S. Cl. ...................... 359/495; 359/494; 359/497; 359/352
(58) Field of Search .................................. 359/491, 492, 359/494, 495, 497, 498, 599, 352

(56) References Cited

U.S. PATENT DOCUMENTS

| | | |
|---|---|---|
| Re. 34,605 | 5/1994 | Schrenk et al. . |
| 2,102,632 | 12/1937 | Land . |
| 2,311,840 | 2/1943 | Land . |
| 2,423,322 | 7/1947 | Hurley, Jr. . |
| 2,617,329 | 11/1952 | Dreyer . |
| 3,442,755 | 5/1969 | Walters et al. . |

(List continued on next page.)

FOREIGN PATENT DOCUMENTS

| | | |
|---|---|---|
| 1327286 | 3/1994 | (CA) . |
| 0 048544 | 3/1982 | (EP) . |
| 062751 | 10/1982 | (EP) . |
| 426636 | 5/1991 | (EP) . |
| 469732 | 2/1992 | (EP) . |

(List continued on next page.)

OTHER PUBLICATIONS

Alfrey, Jr. et al., "Physical Optics of Iridescent Multilayered Plastic Films," *Polymer Engineering and Science*, 9(6), pp. 400–404 (Nov. 1969).

Hodgkinson, I. et al., "Effective principal refractive indices and column angles for periodic stacks of thin birefringent films," *J. Opt. Soc. Am. A.*, 10(9), pp. 2065–2071 (1993).

(List continued on next page.)

*Primary Examiner*—Darren Schuberg
(74) *Attorney, Agent, or Firm*—David B. Patchett

(57) ABSTRACT

The present invention provides light valves including polarizing elements in which light transmission can be controlled by rotating at least one of the polarizing elements about an in-plane axis. Although reflective polarizing elements are preferred in devices according to the present invention to reduce the problem of heat build-up, the use of absorptive or other polarizers may also be envisioned. The polarizing elements may also include at least one reflective polarizer in combination with an infrared reflective material or an infrared absorptive material. The polarizing elements can be included in light valves to control light transmission by rotating at least one of the polarizing elements about an in-plane axis. The light valves according to the present invention may find use in any application in which the transmission of light (visible or otherwise) is to be controlled. Examples of specific applications include, but are not limited to: windows, luminaires, skylights, etc.

11 Claims, 17 Drawing Sheets

U.S. PATENT DOCUMENTS

| | | |
|---|---|---|
| 3,535,016 | 10/1970 | Malifaud . |
| 3,610,729 | 10/1971 | Rogers . |
| 3,647,612 | 3/1972 | Schrenk et al. . |
| 3,663,089 | 5/1972 | Makas . |
| 3,711,176 | 1/1973 | Alfrey, Jr. et al. . |
| 3,759,647 | 9/1973 | Schrenk et al. . |
| 3,773,882 | 11/1973 | Schrenk . |
| 3,801,429 | 4/1974 | Schrenk et al. . |
| 4,025,688 | 5/1977 | Nagy et al. . |
| 4,094,947 | 6/1978 | Alfrey et al. . |
| 4,123,141 | 10/1978 | Schuler . |
| 4,268,127 | 5/1981 | Oshima et al. . |
| 4,285,577 | 8/1981 | Schuler . |
| 4,310,584 | 1/1982 | Cooper et al. . |
| 4,315,258 | 2/1982 | McKnight et al. . |
| 4,353,593 | 10/1982 | Henson . |
| 4,364,375 | 12/1982 | Younghouse . |
| 4,446,305 | 5/1984 | Rogers et al. . |
| 4,500,173 | 2/1985 | Leibowitz et al. . |
| 4,509,825 | 4/1985 | Otto et al. . |
| 4,511,215 | 4/1985 | Butler . |
| 4,515,441 | 5/1985 | Wentz . |
| 4,520,189 | 5/1985 | Rogers et al. . |
| 4,521,588 | 6/1985 | Rogers et al. . |
| 4,525,413 | 6/1985 | Rogers et al. . |
| 4,540,241 | 9/1985 | Rivier . |
| 4,540,623 | 9/1985 | Im et al. . |
| 4,688,897 | 8/1987 | Grinberg et al. . |
| 4,746,162 | 5/1988 | Maness . |
| 4,773,733 | 9/1988 | Murphy, Jr. et al. . |
| 4,791,540 | 12/1988 | Dreyer, Jr. et al. . |
| 4,797,308 | 1/1989 | MAttin . |
| 4,805,984 | 2/1989 | Cobb, Jr. . |
| 4,813,765 | 3/1989 | Negishi . |
| 4,902,112 | 2/1990 | Lowe . |
| 4,937,134 | 6/1990 | Schrenk et al. . |
| 5,033,829 | 7/1991 | Faroughy . |
| 5,089,318 | 2/1992 | Shetty et al. . |
| 5,094,788 | 3/1992 | Schrenk et al. . |
| 5,094,793 | 3/1992 | Schrenk et al. . |
| 5,095,210 | 3/1992 | Wheatley et al. . |
| 5,103,337 | 4/1992 | Schrenk et al. . |
| 5,122,905 | 6/1992 | Wheatley et al. . |
| 5,122,906 | 6/1992 | Wheatley . |
| 5,126,880 | 6/1992 | Wheatley et al. . |
| 5,135,279 | 8/1992 | Beatty . |
| 5,149,578 | 9/1992 | Wheatley et al. . |
| 5,164,856 | 11/1992 | Zhang et al. . |
| 5,202,074 | 4/1993 | Schrenk et al. . |
| 5,217,794 | 6/1993 | Schrenk . |
| 5,233,465 | 8/1993 | Wheatley et al. . |
| 5,234,729 | 8/1993 | Wheatley et al. . |
| 5,237,641 | 8/1993 | Jacobson et al. . |
| 5,269,995 | 12/1993 | Ramanathan et al. . |
| 5,278,694 | 1/1994 | Wheatley et al. . |
| 5,316,703 | 5/1994 | Schrenk . |
| 5,339,198 | 8/1994 | Wheatly et al. . |
| 5,353,154 | 10/1994 | Lutz et al. . |
| 5,360,659 | 11/1994 | Arends et al. . |
| 5,389,324 | 2/1995 | Lewis et al. . |
| 5,422,756 | 6/1995 | Weber . |
| 5,424,119 | 6/1995 | Phillips et al. . |
| 5,448,404 | 9/1995 | Schrenk et al. . |
| 5,451,449 | 9/1995 | Shetty et al. . |
| 5,467,266 | 11/1995 | Jacobs et al. . |
| 5,481,445 | 1/1996 | Sitzema et al. . |
| 5,486,884 | 1/1996 | De Vaan . |
| 5,486,949 | 1/1996 | Schrenk et al. . |
| 5,540,978 | 7/1996 | Schrenk . |
| 5,550,660 | 8/1996 | Yang . |
| 5,552,927 | 9/1996 | Wheatly et al. . |
| 5,564,771 | 10/1996 | Chesters . |
| 5,568,316 | 10/1996 | Schrenk et al. . |
| 5,608,990 | 3/1997 | Kyle . |
| 5,612,820 | 3/1997 | Schrenk et al. . |
| 5,663,621 | 9/1997 | Popat . |
| 5,686,979 | 11/1997 | Weber et al. . |
| 5,721,603 | 2/1998 | De Vaan et al. . |
| 5,825,543 * | 10/1998 | Ouderkirk et al. ................. 359/494 |

FOREIGN PATENT DOCUMENTS

| | | |
|---|---|---|
| 514223 | 11/1992 | (EP) . |
| 0 597 261 | 5/1994 | (EP) . |
| 0 606 939 | 7/1994 | (EP) . |
| 2 675 591 | 10/1992 | (FR) . |
| 2 028 528 | 3/1980 | (GB) . |
| 2 270 104 | 3/1994 | (GB) . |
| 5-288910 | 5/1993 | (JP) . |
| 6-11607 | 1/1994 | (JP) . |
| 8803165 | 7/1990 | (NL) . |
| 91/09719 | 7/1991 | (WO) . |
| WO 95/17303 | 6/1995 | (WO) . |
| WO 95/17691 | 6/1995 | (WO) . |
| WO 95/17692 | 6/1995 | (WO) . |
| WO 95/17699 | 6/1995 | (WO) . |
| WO 96/31794 | 10/1996 | (WO) . |

OTHER PUBLICATIONS

Im, J. et al., "Coextruded Microlayer Film and Sheet," *Journal of Plastic Film and Sheeting,* 4, pp. 104–115 (Apr., 1988).

Radford et al., "Reflectively of Iridescent Coextruded Multilayered Plastic Films," *Polymer Engineering and Science,* 13(3), pp. 216–211 (May, 1973); Dow Chemical Co., American Chemical Society Symposium on "Coextruded Plastic Films, Fibers, Composites," Apr. 9–14, 1972.

Scheffer, Terry J., "Twisted nematic display with cholesteric reflector," *J. Phys. D. Appl. Phys.,* 8(12), 1975.

Schrenk, W. et al., "Coextruded Iridescent Film," *TAPPI Paper Synthesis Conference,* Atlanta, Georgia, pp. 141–145 (Sep. 27–29, 1976).

Schrenk, et al., "Coextruded Multilayer Polymer Films and Sheet," *Polymer Blends* (Ch. 15), 2, 129–165, Academic Press, Inc. (1978).

Schrenk et al., "Interfacial Flow Instability in Multilayer Coextrusion," *Polymer Engineering and Science,* 18(8), pp. 620–623 (Jun. 1978).

Schrenk, W. et al., "Coextruded Elastomeric Optical Interference Film," *SPE Annual Technical Conference,* Atlanta, GA, pp. 1703–1707 (1988).

Schrenk, W. et al., "Coextruded Infrared Reflecting Film," 7th *Annual Meeting Polymer Processing Society,* Hamilton, Ontario, Canada, pp. 222–223 (Apr. 1991).

Schrenk, W., "New Developments in Coextrusion," *International Conference on Advances In Polymer Processing,* New Orleans, Louisiana, (Apr. 2–4, 1991).

Camak et al., Processing Characteristics, Structure Development, and Properties of Uni–and Biaxialy Stretched Poly-)Ethylene 2, 6–Napthalate) (PEN) *Films,* 30(12), pp. 721–733 (Jun. 1990).

Schrenk, "New Developments In Coextrusion," International Conference on Advances In Polymer Processing, New Orleans, LA, 10 pgs., (Apr. 2–4, 1991).

* cited by examiner

INFRARED SELECTIVE REFLECTIVE POLARIZING ELEMENT

RELATED APPLICATIONS

This is a continuation of U.S. application Ser. No. 08/986,281, now U.S. Pat. No. 5,999,316, filed on Dec. 6, 1997, which is hereby incorporated by reference in its entirety.

FIELD OF THE INVENTION

The present invention relates to the field of light control devices and methods. More particularly, the present invention provides polarizing elements and light valves which use one or more polarizing elements that rotate about an in-plane axis to control the passage of light through the device.

BACKGROUND OF THE INVENTION

Manual control of light trnsmission is generally required for many purposes, including industrial, commercial, and residential applications. One common application is the control of light passing through a window, skylight, or other opening for a variety of reasons, e.g., controlling visible light transmission, ensuring privacy, reducing heat build-up in a room, etc. Many types of curtains, venetian blinds, shades, draperies, shutters, and the like are used to control the amount of light admitted into a room or building through a window, skylight, or other opening.

In many cases, the devices used as light valves are totally or partially opaque and function by absorbing incident light. Because the light is absorbed by the devices, they typically convert light energy into heat, which can then be radiated into the building or space in which the devices are located. In addition, while some of the devices, e.g., venetian blinds and shutters, are effective at ensuring privacy, they may also excessively restrict the view through the window.

The use of polarizers as light valves in many different applications is well-known. Typically, two polarizers are used, at least one of which can be translated or rotated. In general, the transmission axis of the front polarizer is "crossed" with the transmission axis of the rear polarizer at angles that can vary between 0 and 90° to adjust the amount of light transmitted through the polarizers. The rotation is typically about an axis that is normal to the plane in which the polarizer is located, i.e., the axis of rotation is out of the plane in which the rotating polarizer is located. As a result, the rotating light valves typically require that the window or other opening in which they are placed be generally circular. In other words, such devices are not particularly useful for windows which have a generally square or rectangular outline.

Other approaches at controlling light transmission through a window include the use of privacy films, such as those described in U.S. Pat. No. 5,686,979 (Weber et al.). Such privacy films use an electronically switched columnar dispersed liquid crystal film that provides reversible opacity with or without mechanical movement.

In addition, although the use of polarization to control the transmission of light has been discussed in many different manners, most of the discussions focus on the use of absorptive polarizers. Typically, absorptive polarizers use dichroic dyes which absorb light of one polarization orientation more strongly than that of the orthogonal polarization orientation. Because absorptive polarizers absorb light having one polarization orientation, they can also present the problems of conversion of absorbed solar energy into thermal energy which is then radiated into the interior of a room.

As a result, a need exists for a light valve that can a) control the amount of light passing through an opening, b) provide high contrast between its open and closed states, c) provide for absorption or reflection to improve energy efficiency, and/or d) provide control over viewing angle to either limit or expand viewing angles.

SUMMARY OF INVENTION

The present invention provides polarizing elements including at least one reflective polarizer in combination with an infred reflective material or an infrared absorptive material. The polarizing elements can be included in light valves to control light transmission by rotating at least one of the polarizing elements about an in-plane axis.

The light valves according to the present invention may find use in any application in which the transmission of light (visible or otherwise) is to be controlled. Examples of specific applications include, but are not limited to: windows, luninaires, skylights, etc.

In one aspect, the present invention provides a polarizing element including at least one of an infrared absorptive material that absorbs substantially all of the infrared light incident thereon or an infrared reflective material that reflects substantially all of the infared light incident thereon. The polarizing element further includes a reflective polarizer including first and second materials, at least one of the first and second materials being birefringent, wherein a refractive index difference between the first and second materials for light having a first polarization orientation is large enough to substantially reflect the light having the first polarization orientation, and firther wherein a refractive index difference between the first and second materials for light having a second polarization orientation is small enough to substantially transmit the light having the second polarization orientation.

The reflective polarizer of the polarizing element may be a diffusely reflective polarizer that diffusely reflects the light having the first polarization orientation. Polarizing elements that include a diffuisely reflective polarizer may also include a spectrally reflective polarizer comprising third and fourth materials in different layers within the spectrally reflective polarizer, at least one of the third and fourth materials being birefringent, wherein a refractive index difference between the third and fourth materials for light having a first polarization orientation is large enough to substantially spectrally reflect the light having the first polarization orientation, and further wherein a refractive index difference between the third and fourth materials for light having a second polarization orientation is small enough to substantially transmit the light having the second polarization orientation.

In another aspect, the present invention provides a light valve including a first polarizing element having a first transmission axis; and a second polarizing element having an axis of rotation and a second transmission axis intersecting the axis of rotation at a fixed angle. Rotation of the second polarizing element about the axis of rotation to a first orientation relative to the first polarizing element provides maximum transmission of light through the first and second polarizing elements, and rotation of the second polarizing element of about 180 degrees around the axis of rotation to a second orientation provides minimum transmission of incident light through the first and second polarizing elements.

The fixed angle at which the second transmission axis intersects the axis of rotation may be about 45 degrees and/or the first transmission axis may form an angle of about 45 degrees with the axis of rotation of the second polarizing element. The first polarizing element may be stationary relative to the axis of rotation of the second polarizing element.

The light valve may also include two or more second polarizing elements. In some embodiments, the first polarizing element may be provided in the form of a single sheet having a surface, and the second polarizing elements may be located proximate the surface of the first polarizing element.

Either or both of the first and second polarizing elements may include a reflective polarizer. The second polarizing element may include an infrared selective material, e.g., at least one of an infrared absorptive material and an infrared reflective material. The reflective polarizer may include first and second materials, at least one of the first and second materials being birefringent, wherein a refractive index difference between the first and second materials for light having a first polarization orientation is large enough to substantially reflect the light having the first polarization orientation, and frrther wherein a refractive index difference between the first and second materials for light having a second polarization orientation is small enough to substantially transmit the light having the second polarization orientation.

In some embodiments, the first and/or second polarizing elements may each include an absorptive polarizing material and a reflective polarizing material. In other embodiments, the absorptive polarizing material and the reflective polarizing material are located on opposite sides of the second polarizing element, such that only one of the absorptive polarizing material and the reflective polarizing material is located proximate the first polarizing element when the second polarizing element is in the second orientation.

These and other features and advantages of the invention are more fully shown and described in the drawings and detailed description of this invention.

DETAILED DESCRIPTION OF ILLUSTRATIVE EMBODIMENTS OF THE INVENTION

Figure 1:
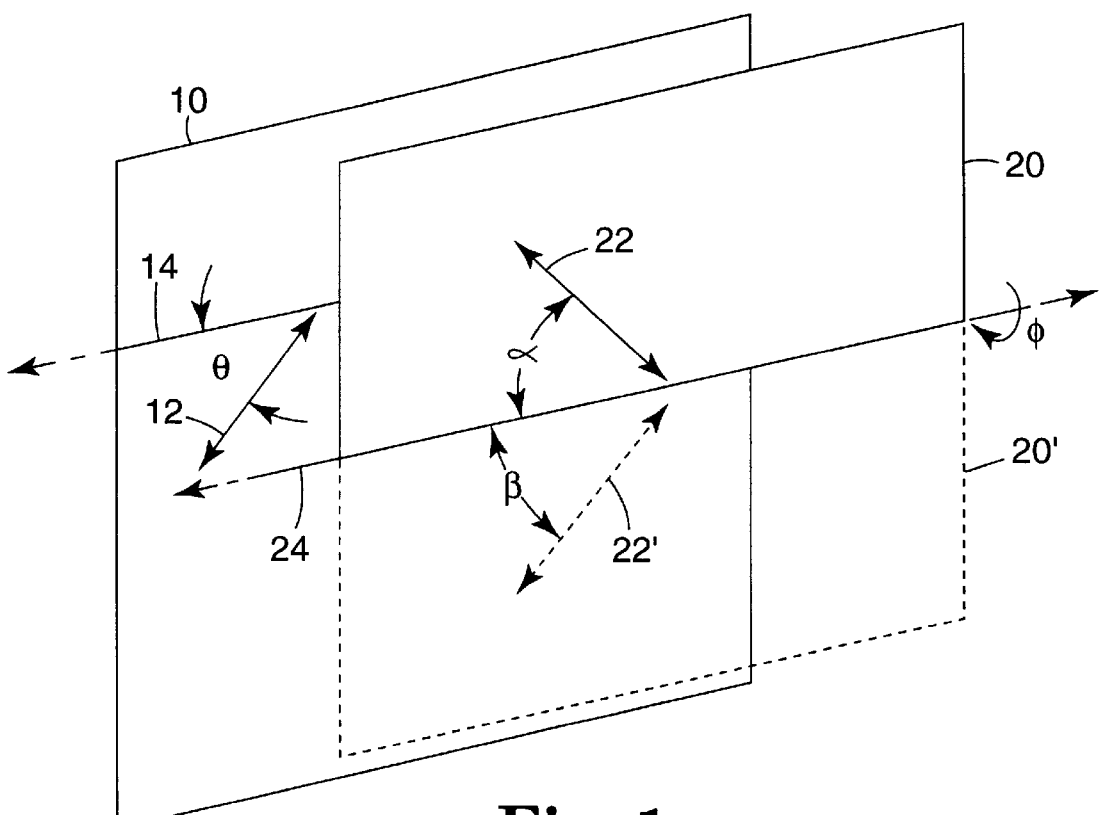
FIG. 1 is a perspective view of one light valve according to the present invention.

Briefly, the present invention provides polarizing elements including at least one reflective polarizer in combination with an infraed reflective material or an infrared absorptive material. The polarizing elements can be included in light valves for controlling the transmission of light through an opening in which one or both of two polarizing elements are rotated about in-plane axes of rotation. The light valves according to the present invention may find use in applications such as control of light passing through windows (e.g., as horizontal blinds such as venetian blinds, vertical blinds, shutters, etc.), in luminaires to control the distribution of light from a light fixture, or they may find use in other applications such as optical systems in industrial, commercial, or other settings.

The plane of the polarizing elements is defined by the transmission axis and the axis of rotation about which the polarizing element is rotated. Where the polarizing element is non-planar, it will be understood that the transmission axis can be projected into a plane and it is that plane in which the axis of rotation is also located, thereby providing for the in-plane axis of rotation that forms a part of the present invention. In other words, the axis of rotation, although typically extending through the body of the polarizing element, may not lie in the physical body of the polarizing element.

Although the illustrative embodiments discussed below are described as using "front" and "rear" polarizing elements, those terms are used only to facilitate an understanding of the invention and should not be construed as limiting the orientation of the light valves according to the present invention in any particular application.

As used herein, the terms "specular reflection" and "specular reflectance" refer to the reflectance of light rays into an emergent cone with a vertex angle of 16 degrees centered around the specular angle. The terms "diffuse reflection" or "diffuse reflectance" refer to the reflection of rays that are outside the specular cone defined above. The terms "total reflectance" or "total reflection" refer to the combined reflectance of all light from a surface. Thus, total reflection is the sum of specular and diffuse reflection.

Similarly, the terms "specular transmission" and "specular transmittance" are used herein in reference to the transmission of rays into an emergent cone with a vertex angle of 16 degrees centered around the specular direction. The terms "diffuse transmission" and "diffuse transmittance" are used herein in reference to the transmission of all rays that are outside the specular cone defined above. The terms "total transmission" or "total transmittance" refer to the combined transmission of all light through an optical body. Thus, total transmission is the sum of specular and diffluse transmission.

As used herein, the term "extinction ratio" is defmed to mean the ratio of total light transmitted in one polarization to the light transmitted in an orthogonal polarization.

The effect of the illustrative light valves on incident light as described below, i.e., the incident light can be transmitted or blocked, generally assumes that the incident light is approaching normal to the light valves. Those skilled in the art will, however, understand that when using any polarizing element, the performance of the polarizing elements in the light valves with off-axis light (i.e., light approaching the light valve off the normal axis) may also need to be considered. In addition, the performance of the light valves in terms of amounts of incident light transmitted or blocked generally ignores the effects of surface reflections in the light valves to simplify the discussions.

In those embodiments in which one of the polarizing elements is stationary, i.e., is not rotated, the transmission axes of the polarizing elements are preferably oriented at an angle of about 45° with respect to the axis of rotation of the rotating polarizing element. As a result, rotation of one of the polarizing elements about the axis of rotation to a first orientation results in alignment of the transmission axes of the front and rear polarizing elements. By aligning the transmission axes, light having that polarization orientation can pass through the polarizing elements. Alternately, 180 degree rotation of one of the polarizing elements to a second polarization orientation results in orthogonal orientation of the two transmission axes. That "crossing" of the axes of transmission will result in reflection and/or absorption of substantially all incident light directed through the front and rear polarizing elements.

In other embodiments of light valves, according to the present invention, the 45° orientation of transmission axes is not required to effect a change between a light valve which transmits incident light to a light valve which is substantially opaque to incident light. In those embodiments, it is typically required that both of the polarizing elements be rotated about in-plane axes of rotation to effect the change between transmission and opacity in the light valve.

It should be understood that although the discussion below will contrast states of light valves between transmission and opacity, open and closed, transmitting and blocking, etc., such terms are relative. Furthermore, it may be desired to orient the various axes of transmission such that at no time is substantially all incident light reflected or blocked from transmission through the light valves, according to the present invention. It may, rather, be desired only to attenuate the transmission of light through an opening and, in those instances, the axes of transmission of the front and rear polarizing elements may form angles that are between 0 and 90° with respect to each other to allow transmission of a portion of the light when the light valve is in the closed or blocking state.

Light valves according to the present invention can use a variety of polarizing materials in the polarizing elements. Examples of suitable polarizing element materials include sheets, films, coatings, etc., such as those described in, e.g., copending and commonly assigned U.S. patent application Ser. Nos. 081402,041 (filed Mar. 10, 1995); 08/402,042 (filed Mar. 10, 1995); and U.S. Pat. No. 5,825,543 (issued on Oct. 20, 1998). Although many of these polarizing materials are typically referred to as reflective polarizers in which light that is not transmitted is typically reflected, it will be understood that the present invention may use other polarizing materials or structures that prevent or reduce the transmission of light having one polarization orientation. Examples of absorptive polarizing materials, coatings or structures include, but are not limited to dichroic dyes. It should be understood that, for the purposes of the present invention, the composition of the polarizing materials is not important. Rather, it is the functional performance of the polarizing materials that is important, i.e., that they preferentially absorb or reflect (specularly or diffuisely) light having one polarization orientation.

Figure 22A:
FIGS. 22a–22e are schematic cross-sectional views of illustrative polarizing elements according to the present invention.

The polarizing elements according to the present invention may include only a single type of polarizing material or they may include combinations of two or more polarizing materials to achieve a desired optical effect. Turning to FIGS. 22a–22e, various combinations of polarizing elements are depicted in schematic cross-sectional views. FIG. 22a depicts a polarizing element including only a single layer 130 of polarizing material.

Figure 22B:
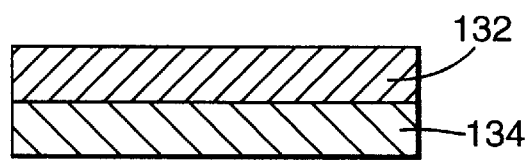

FIG. 22b depicts a polarizing element including two layers 132 and 134 of polarizing materials. For example, the two layers could include two layers of the same polarizing material. In another variation, the two layers could include a specularly reflective polarizing material 132 in combination with a diffusely reflective polarizing material 134.

Figure 22C:
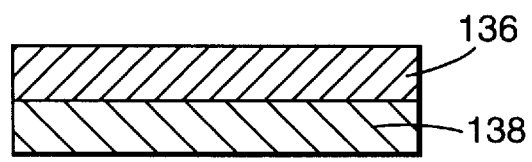

FIG. 22c depicts layer 136 of specularly reflective polarizing material and layer 138 of an absorptive polarizing material.

Figure 22D:
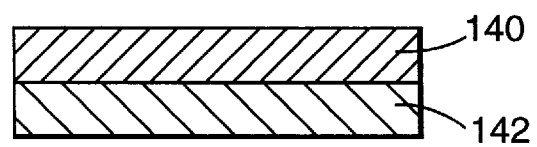

FIG. 22d depicts a layer 140 of diffusely reflective polarizing material and a layer 142 of an absorptive polarizing material.

Figure 22E:
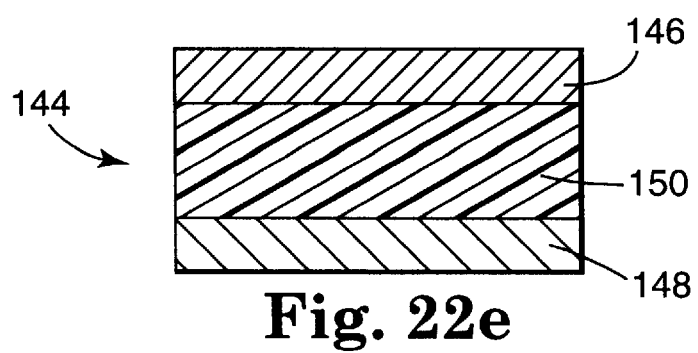

FIG. 22e is provided to indicate that, within a given polarizing element 144, two or more layers 146 and 148 of polarizing materials may be located on opposing sides of a core 150 to provide, e.g., additional rigidity or some other function to the polarizing element 144. In such an embodiment, it is preferred that the core 150 be substantially polarization preserving of the light passing through the core 150. It may also be preferred that the core 150 be substantially transparent to desired wavelengths of light.

Furthermore, although only two layers of polarizing materials are depicted in combination, it will be understood that more than two layers of the same or different polarizing materials could also be used in polarizing elements of light valves according to the present invention.

It should also be understood that the light valves according to the present invention could be used in combination with other optical elements such as infrared reflective or absorptive materials, etc. These materials could be provided in addition to the light valves according to the present invention, or they could be incorporated into the light valves. For example, the core 150 of the polarizing element 144 could be an infrared absorptive or infrared reflective material. Alternatively, the layer 150 could be made of a polarizing material while layer 146 is infrared absorptive and layer 148 could be infrared reflective.

In general it is preferred, but not required that at least one of the preferred polarizing elements be constructed from reflective polarizing materials. As a result, wherever the light that is not transmitted through the polarizing elements is described as reflecting in the discussions regarding the polarizing elements, it should be understood that the reflected light could alternately be absorbed. In yet another variation, portions of the light that is described as reflected could be absorbed while other portions could be reflected.

Furthermore, although the polarizing elements according to the present invention are depicted in the illustrative embodiments as generally planar articles, it should be understood that the polarizing elements could take many other shapes. In all cases, however, the axis of t ranssion and the axis of rotation can be used to defme a plane in which both axes are contained. In many cases the polarizing elements will include polarizing material that is supplied in film or sheet form.

Among the reflective polarizers contemplated for use in connection with the present invention are two classes of reflective polarizers, both of which rely on index of refraction differences between at least two different materials to selectively reflect light of one polarization orientation while transmitting light with an orthogonal polarization orientation. Those two classes are multilayer reflective polarizers as described in, e.g., U.S. application Ser. Nos. 08/402,041 and 08/402,042 and continuous/disperse phase reflective polarizers as described in, e.g. U.S. Pat. No. 5,825,543. Each of these two different reflective polarizers will be discussed below in more detail.

Multilaver Reflective Polarizers

U.S. application Ser. Nos. 08/402,041 describes multilayer reflective polarizers while 08/402,042 describes multilayer reflective polarizers in combination with, e.g., dichroic polarizers to enhance optical polarization performance.

Figure 23:
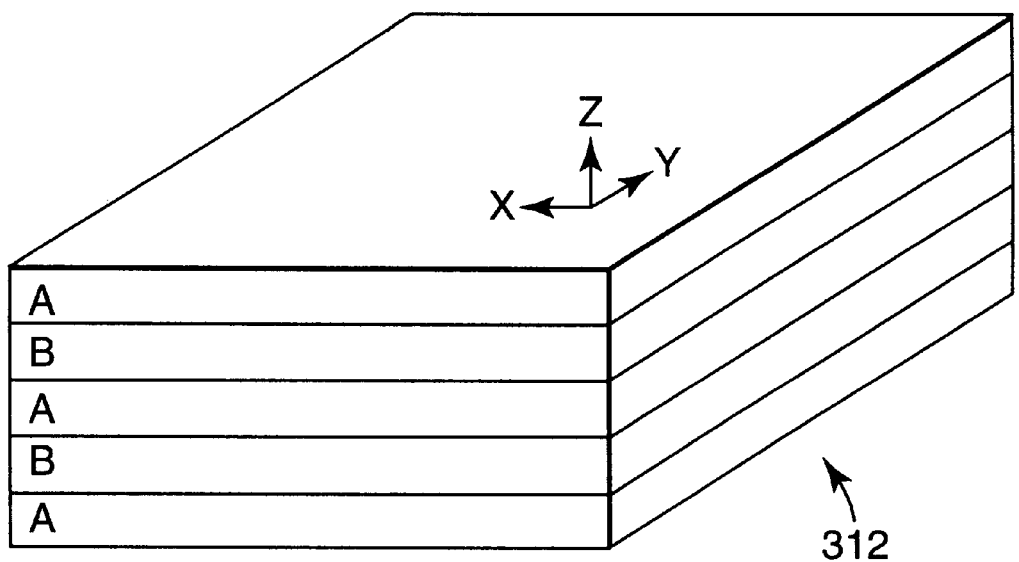
FIG. 23 is a schematic drawing illustrating a multilayer reflective polarizing body.

The preferred and illustrative multilayer reflective polarizer body 312 shown in FIG. 23 is made of alternating layers (ABABA . . . ) of two different polymeric materials. These are referred to as material "(A)" and material "(B)" throughout the drawings and description. The two materials are extruded together and the resulting multiple layer (ABABA . . . ) material is stretched along one axis (X) and is not stretched appreciably along the other axis (Y). The X axis is referred to as the "stretched" direction while the Y axis is referred to as the "transverse" direction.

The (B) material has a nominal index of refraction (1.64 for example) which is not substantially altered by the stretching process. The (A) material has the property of having the index of refraction altered by the stretching process. For example, a uniaxially stretched sheet of the (A) material will have one index of refraction (1.88, for example) associated with the stretched direction and a different index of refraction (1.64, for example) associated with the transverse direction. By way of definition, the index of refraction associated with an in-plane axis (an axis parallel to the surface of the film) is the effective index of refraction for plane-polarized incident light whose plane of polarization is parallel to that axis.

Thus, after stretching, the multiple layer stack (ABABA . . . ) of material shows a large refractive index difference between layers (1.88 minus 1.64) associated with the stretched direction. While in the transverse direction, the associated indices of refraction between layers are essentially the same (1.64 and 1.64 in the example). These optical characteristics cause the multiple layer laminate to act as a reflecting polarizer that will transmit the polarization component of the incident light which is correctly oriented with respect to the axis 322. Axis 322 is defined as the transmission axis. The light which is transmitted by the multilayer reflective polarizer body 312 is referred to as having a first polarization orientation.

The light which does not pass through the reflective polarizer body 312 has a polarization orientation orthogonal or perpendicular to the first orientation. Light exhibiting this polarization orientation will encounter the index difference which results in reflection of this light. This defines a so-called "extinction" axis. In this fashion the multilayer reflective polarizer body 312 transmits light having a selected polarization, and reflects light having the other polarization.

If desired, two or more sheets of the multilayer reflective polarizers may be used in a composite to increase reflectivity, optical band width, or both. If the optical thicknesses of pairs of layers within the sheets are substantially equal, the composite will reflect, at somewhat greater efficiency, substantially the same band width and spectral range of reflectivity (i.e., "band") as the individual sheets. If the optical thicknesses of pairs of layers within the sheets are not substantially equal, the composite will reflect across a broader band width than the individual sheets. A composite combining mirror sheets with polarizer sheets is usefull for increasing total reflectance while still polarizing transmitted light. Alternatively, a single sheet may be asymmetrically biaxially stretched to produce a film having selective reflective and polarizing properties.

Lamination of two or more sheets together is advantageous, to improve reflectivity or to broaden the bandwidth. Amorphous copolyesters are useful as laminating materials, with VITEL Brand 3000 and 3300 from the Goodyear Tire and Rubber Co. of Akron, Ohio, noted as materials that have been tried. The choice of laminating material is broad, with adhesion to the sheets, optical clarity and exclusion of air being the primary guiding principles.

The optical properties and design considerations of multilayer reflective polarizers allow the construction of multilayer stacks for which the Brewster angle (the angle at which reflectance goes to zero) is very large or is nonexistent. This allows for the construction of multilayer polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

The multilayer reflective polarizers can include tens, hundreds or thousands of layers, and each layer can be made from any of a number of different materials. The characteristics which deterrnine the choice of materials for a particular multilayer reflective polarizer depend upon the desired optical performance of the multilayer reflective polarizer.

The multilayer reflective polarizer can contain as many materials as there are layers in the multilayer reflective polarizer. For ease of manufacture, preferred optical thin film multilayer reflective polarizers contain only a few different materials. For purposes of illustration, the discussion herein will focus on multilayer reflective polarizers including two materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

A biaxial birefringent multilayer reflective polarizer can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. As a result the biaxial bireflingent multilayer reflective polarizer transmits light of one polarization and reflects light of the other polarization. By controlling the three indices of refraction of each film, nx, ny and nz, the desired polarizer behavior can be obtained. Again, the indices of refraction can be measured directly or can be indirectly observed by analysis of the spectra of the resulting film, as described herein.

Thus, by reducing the z-index mismatch between layers of a biaxial birefringent multilayer reflective polarizers, and/or by introducing a y-index mismatch to produce a Brewster effect, off-axis reflectivity, and therefore off-axis color, are minimized along the transmission axis of a multilayer reflecting polarizer.

It should also be noted that narrow band reflective polarizers operating over a narrow wavelength range can also be designed using the principles described herein. These can be made to produce reflective polarizers in the red, green, blue, cyan, magenta, or yellow bands, for example.

An ideal reflecting polarizer should transmit all light of one polarization, and reflect all light of the other polarization. Unless laminated on both sides to glass or to another film with a clear optical adhesive, surface reflections at the air/reflecting polarizer interface will reduce the transmission of light of the desired polarization. Thus, it may in some cases be useful to add an antireflection (AR) coating to the reflecting polarizer. The AR coating is preferably designed to reflect a film of index 1.64 for PEN based polarizrs in air, because that is the index of all layers in the nonstretch (y) direction. The same coating will have essentially no effect on the stretch direction because the alternating index stack of the stretch direction has a very high reflection coefficient irrespective of the presence or absence of surface reflections. Any AR coating known in the art could be applied, provided that the coating does not overheat or damage the multilayer film being coated. An exemplary coating would be a quarterwave thick coating of low index material, ideally with index near the square root of 1.64 (for PEN based materials).

In some cases a multilayer reflective polarizer and a dichroic polarizer may be combined. The dichroic and multilayer reflective polarizers are typically in close proximity to each other, and are preferably bonded together to eliminate the air gap between the polarizers. The combination of the two polarizers provides a high reflectivity for light of a first polarization and high trnnsmission for light of a second, perpendicular polarization from the reflective polarizer side of the optical polarizer, and high absorption for light of the first polarization and high transmission for light of the second, perpendicular polarization from the dichroic polarizer side. Iridescence as seen in transmission and when viewed in reflection from the dichroic polarizer side is also reduced as compared to the reflective polarizer alone. This reduction in iridescence is usefull in improving the cosmetic appearance of optical displays, the extinction ratio of optical polarizers, and the optical uniformity of a display.

The increased extinction ratio and low reflectivity of the multilayer reflective polarizer allows use of a lower extinction ratio dichroic polarizer in applications requiring a given extinction ratio. By lowering the extinction ratio required of dichroic polarizer the absorptive losses in the dichroic polarizer for transmitted rays can be reduced. Thus, the combination of a multilayer reflective polarizer and a dichroic polarizer has improved transmissive extinction ratios for rays entering from either side, low reflected intensity for rays partially transmitted by the dichroic polarizer in the first polarization that are reflected by the multilayer reflective polarizer, and lower absorptive losses as compared to a dichroic polarizer alone.

Figure 24:
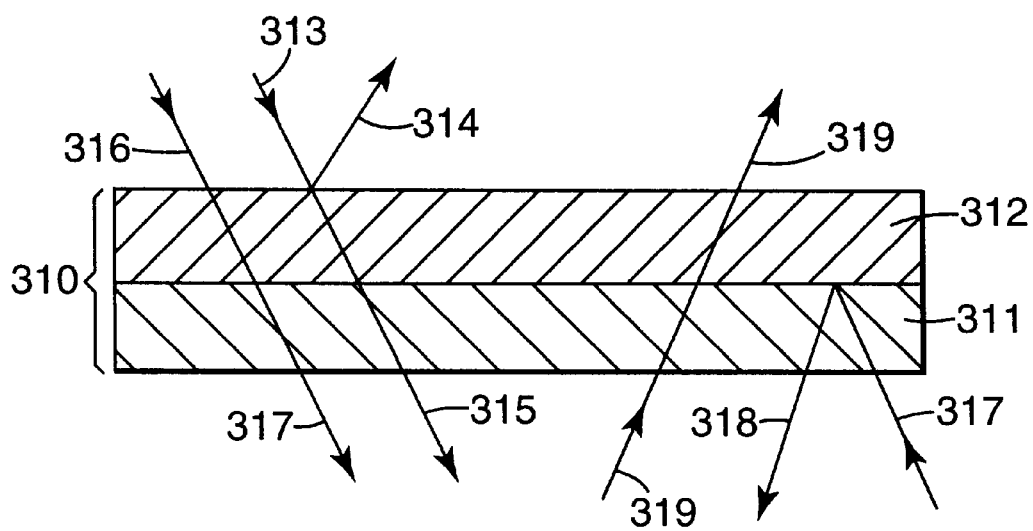
FIG. 24 is a schematic diagram of one polarizing element according to the present invention including a reflective polarizing body in combination with a dichroic polarizing body.

FIG. 24 illustrates a reflective polarizing element 310 that includes a dichroic polarizer 311 and a multilayer reflective polarizer 312. The two polarizers are aligned to provide maximum transmissivity. The combination of the two polarizers provides a high reflectivity for light of a first polarization and high transmission for light of a second, perpendicular polarization from the reflective polarizer side of the optical polarizer, and high absorption for light of the first polarization and high transmission for light of the second, perpendicular polarization from the dichroic polarizer side.

In use, the combined polarizers are illuminated on one or both of the outside facing surfaces. Ray 313 is of a polarization that is preferentially reflected by reflective polarizer 312 to form ray 314. Light of ray 313 transmitted by reflective polarizer 312 forms ray 315 which is attenuated by dichroic polarizer 311. Light ray 316 which is perpendicularly polarized to ray 313 is preferentially transmitted by reflective polarizer 312 and is slightly attenuated by dichroic polarizer 311. Ray 317 is of a polarization that is preferentially absorbed by dichroic polarizer 311, and which is also preferably of the same polarization as ray 313. The portion of light of ray 317 which is transmitted by dichroic polarizer 311 is further attenuated by reflection off reflective polarizer 312 forming ray 318 which is frther absorbed by dichroic polarizer 311. Light ray 319 which is polarized perpendicular to ray 317, and which is of the same polarization as ray 316, is preferentially transmitted by both dichroic and reflective polarizers 311 and 312, respectively.

The dichroic polarizer 311 is typically in close proximity to the reflective polarizer 312. Preferably they are bonded to each other to eliminate the air gap between the polarizers.

The configuration of dichroic and reflective polarizers shown in FIG. 24 creates a high efficiency optical polarizer. Combining dichroic polarizer 311 with reflective polarizer 312 results in an optical polarizer 310 which has a higher extinction ratio for transmitted light than that which is achieved using the dichroic polarizer alone. This configuration also produces low reflectivity for ray 317 from the dichroic polarizer side due to attenuation of reflected ray 318 by dichroic polarizer 311. For applications requiring a given extinction ratio and high traismissivity, the increased extinction ratio and low reflectivity of optical polarizer 310 allows the use of a dichroic polarizer 311 which has a lower extinction of the first polarization than could otherwise be used. By lowering the extinction required of dichroic polarizer 311, the absorptive losses in polarizer 311 for transmitted rays 316 and 319 can be reduced. Thus, the optical polarizer 310 has improved transmissive extinction ratios for ray pair 317 and 319 and ray pair 313 and 316, low reflected intensity for reflected ray 318 off of reflective polarizer 312, and lower absorptive losses than could be achieved using a dichroic polarizer alone.

The reflective and dichroic polarizers may be various combinations of broad band and narrow band polarizers. For example, a narrow band reflective polarizer may be combined with a dichroic polarizer with extinction over the same band range. This combination can be used to produce polarizers in the red, green, blue, cyan, magenta, or yellow bands with higher extinction and superior color definition compared to a colored dichroic polarizer. Other combinations include the use of a broad band reflective polarizer with dichroic polarizers with nonuniform extinction in the visible spectrum. For example, certain polyvinyl alcohol/iodine polarizers have excellent extinction in the green and red portion of the spectrum, and less in the blue. This polarizer can be combined with a broad band reflective polarizer in order to provide good extinction at blue wavelengths. Nonuniform optical extinction may also be useful for increasing the optical performance of the combined polarizers. For example, the maximum radiometric transmission from the combination of reflective and dichroic polarizers may be obtained with minimum luminous reflectivity by using a dichroic polarizer with relatively high absorption in the green and less absorption in the blue and red. Insufficient extinction in the reflective polarizer at normal and off-normal angles may also be compensated by increasing the extinction of the dichroic polarzer in the necessary spectral regions. For example, a reflective polarizer that has insufficient extinction for red light of the second polarization at off-normal angles can be compensated by using a dichroic polarizer with relatively red high extinction.

Dichroic polarizer 311 can be incorporated into polarizing element 310 by placing the reflective and dichroic polarizers in the same optical path or by laminating them together. Dichroic polarizer 311 can be incorporated with reflective polarizer 312 before orientation by extruding or laminating at least one layer of a mixture of dichroic dyestuff in polymer onto the multilayer cast film, by a dicbroic dyestuff added to the polymer resin of one or more of the skin layers of the multilayer reflective polarizer, or by adding dye to one or more layers in the multilayer stack. Multilayer extrusion techniques also allow the ability to tailor the distribution of dichroic dye within the individual layers making up the optical stack. This may allow the dye to be located in regions of greatest utility. For example, a dye may be preferably concentrated in regions of maximum or minimum "E" field intensity within the optical stack. By appropriate choice of the dichroic dyestuff and polymer matrix, stretching the resulting film will simultaneously produce the dichroic and reflective polarizers in the proper orientation.

A dichroic polarizer suitable for use in this invention is described in U.S. Pat. Nos. 4,895,769 and 4,659,523. The polarizers described in these patents may be combined with the reflective polarizer preferably with one side of the polyvinyl alcohol dichroic polarizer protected with a separate polymer and the other side of the dichroic polarizer bonded to the reflective polarizer. The dichroic polarizer may be made from relatively thin polyvinyl alcohol coatings (i.e., preferably less than 40 g per square meter, more preferably less than 10 $g/m^2$, more preferably less than 4 $g/m^2$, even more preferably less than 2 $g/m^2$). Thin coatings will have less absorption of the polarization perpendicular to the stretch direction, yet still have good extinction in first polarization when the high transmission axis is aligned with the high transmission axis of a reflective polarizer. Thin coatings are also faster to process.

Continuous/Disperse Phase Diffuse Reflective Polarizers

As indicated above, U.S. Pat. No. 5,825,543 discusses one class of diff-usely reflective polarizers in the form of a diffusely reflective film or other optical body comprising a continuous phase and a disperse phase disposed within the continuous phase. The indices of refraction of the materials in the continuous and disperse phases are substantially mismatched (i.e., differ from one another by more than about 0.05) along a first of three mutually orthogonal axes, and are substantially matched (i.e., differ by less than about 0.05) along a second of three mutually orthogonal axes. In some embodiments, the indices of refraction of the continuous and disperse phases can be substantially matched or mismatched along, or parallel to, a third of three mutually orthogonal axes to produce a mirror or a polarizer. Incident light polarized along, or parallel to, a mismatched axis is scattered, resulting in significant diffuse reflection. Incident light polarized along a matched axis is scattered to a much lesser degree and is significantly spectrally transmitted. These properties can be used to make optical films for a variety of uses, including low loss (significantly nonabsorbing) reflective polarizers for which polarizations of light that are not significantly transmitted are diffusely reflected.

In related diffusely reflective polarizers, the optical film or other optical body may include a birefringent continuous phase and a disperse phase, wherein the indices of refraction of the continuous and disperse phases are substantially matched (i.e., wherein the index difference between the continuous and disperse phases is less than about 0.05) along an axis perpendicular to a surface of the optical body.

In other diffusely reflective polarizers, a composite optical body may be provided that includes a polymeric continuous birefringent first phase in which the disperse second phase may be birefringent, but in which the degree of match and mismatch in at least two orthogonal directions is primarily due to the birefringence of the first phase.

In still other diffusely reflective polarizers, the optical body may act as a reflective polarizer with a high extinction ratio. In this aspect, the index difference in the match direction is chosen as small as possible and the difference in the mismatch direction is maximized. The volume fraction, thickness, and disperse phase particle size and shape can be chosen to maximize the extinction ratio, although the relative importance of optical transmission and reflection for the different polarizations may vary for different applications.

The diffusely reflective polarizers may also be provided in the form of an optical body including a continuous phase, a disperse phase whose index of refraction differs from said continuous phase by greater than about 0.05 along a first axis and by less than about 0.05 along a second axis orthogonal to said first axis, and a dichroic dye. The optical body is preferably oriented along at least one axis. The dichroic dye improves the extinction coefficient of the optical body by absorbing, in addition to scattering, light polarized parallel to the axis of orientation.

In the various aspects of the diffusely reflective polarizers, the reflection and transmission properties for at least two orthogonal polarizations of incident light are determined by the selection or manipulation of various parameters, including the optical indices of the continuous and disperse phases, the size and shape of the disperse phase particles, the volume fraction of the disperse phase, the thickness of the optical body through which some fraction of the incident light is to pass, and the wavelength or wavelength band of electromagnetic radiation of interest.

While the present invention will often be described herein with reference to the visible region of the spectrum, various embodiments of the present invention can be used to operate at different wavelengths (and thus frequencies) of electromagnetic radiation through appropriate scaling of the components of the optical body. Thus, as the wavelength increases, the linear size of the components of the optical body are increased so that the dimensions, measured in units of wavelength, remain approximately constant. Another major effect of changing wavelength is that, for most materials of interest, the index of refraction and the absorption coefficient change. However, the principles of index match and mismatch still apply at each wavelength of interest.

Figure 25:
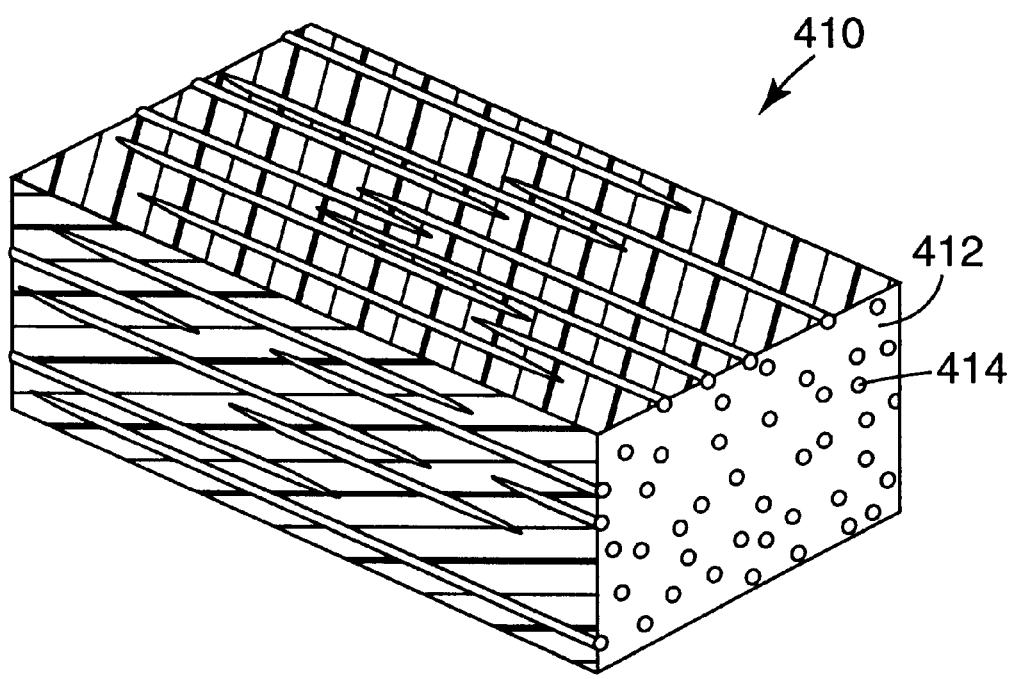
FIG. 25 is a schematic drawing illustrating a diffusely reflective polarizing optical body, wherein the disperse phase is arranged as a series of elongated masses having an essentially circular cross-section.
Figure 26:
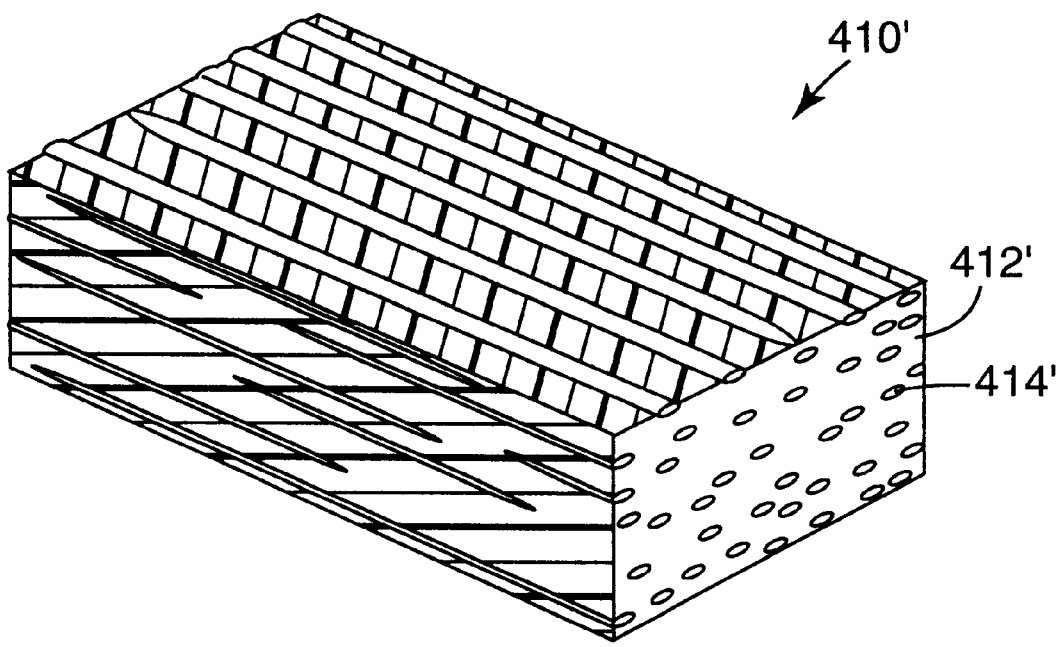
FIG. 26 is a schematic drawing illustrating a diffusely reflective polarizing optical body, wherein the disperse phase is arranged as a series of elongated masses having an essentially elliptical cross-section.

FIGS. 25 and 26 illustrate the construction of two diffusely reflective polarizers for use in connection with the present invention. In accordance with the invention, a diffusely reflective optical film 410/410' or other optical body is produced which consists of a birefringent matrix or continuous phase 412/412' and a discontinuous or disperse phase 414/414'. The birefringence of the continuous phase is typically at least about 0.05, preferably at least about 0.1, more preferably at least about 0.15, and most preferably at least about 0.2.

The indices of refraction of the continuous and disperse phases are substantially matched (i.e., differ by less than about 0.05) along a first of three mutually orthogonal axes, and are substantially mismatched (i.e., differ by more than about 0.05) along a second of three mutually orthogonal axes. Preferably, the indices of refraction of the continuous and disperse phases differ by less than about 0.03 in the match direction, more preferably, less than about 0.02, and most preferably, less than about 0.01. The indices of refraction of the continuous and disperse phases preferably differ in the mismatch direction by at least about 0.07, more preferably, by at least about 0.1, and most preferably, by at least about 0.2.

The mismatch in refractive indices along a particular axis has the effect that incident light polarized along that axis will be substantially scattered, resulting in a significant amount of reflection. By contrast, incident light polarized along an axis in which the refractive indices are matched will be spectrally transmitted or reflected with a much lesser degree of scattering. This effect can be utilized to make a variety of optical devices, including reflective polarizers and mirrors.

The optical materials in the diffuisely reflective polarizers of the present invention may also comprise other materials or additives as are known to the art. Such materials include pigments, dyes, binders, coatings, fillers, compatibilizers, antioxidants (including sterically hindered phenols), surfactants, antimicrobial agents, antistatic agents, flame retardants, foaming agents, lubricants, reinforcers, light stabilizers (including UV stabilizers or blockers), heat stabilizers, impact modifiers, plasticizers, viscosity modifiers, and other such materials. Furthermore, the films and other optical devices made in accordance with the present invention may include one or more outer layers which serve to protect the device from abrasion, impact, or other damage, or which enhance the processability or durability of the device.

Dichroic dyes are a particularly useful additive in some applications to which the optical materials of the present invention may be directed, due to their ability to absorb light of a particular polarization when they are molecularly aligned within the material. When used in a film or other material which predominantly scatters only one polarization of light, the dichroic dye causes the material to absorb one polarization of light more than another. Suitable dichroic dyes for use in the present invention include Congo Red (sodium diphenyl-bis-α-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN.

Other suitable dyes include the following materials:

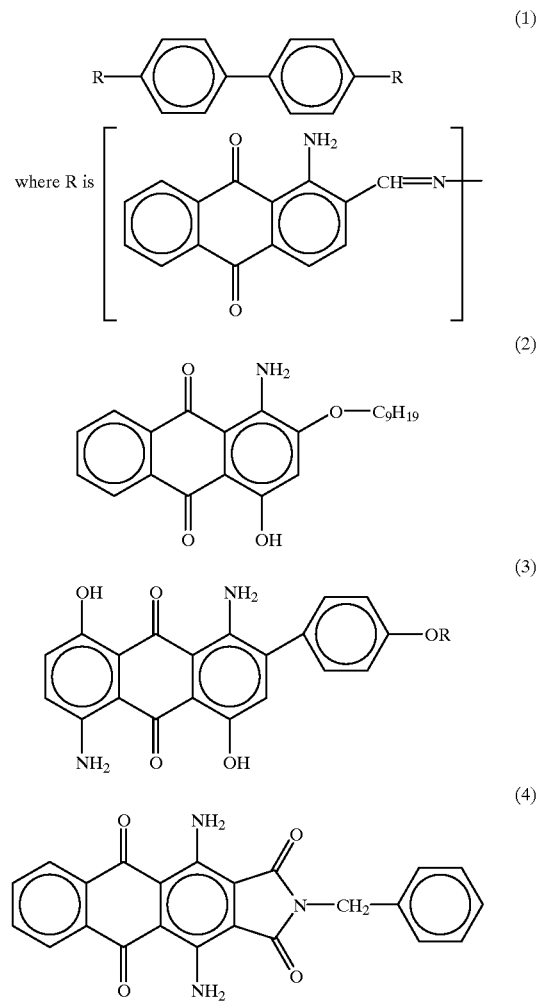

The properties of these dyes, and methods of making them, are discussed in the Kirk Othmer Encyclopedia of Chemical Technology, Vol. 8, pp. 652–661 (4th Ed. 1993), and in the references cited therein.

When a dichroic dye is used in the diff-usely reflective optical bodies including continuous and disperse phases, it may be incorporated into either the continuous or disperse phase.

Dychroic dyes in combination with certain polymer systems exhibit the ability to polarize light to varying degrees. Polyvinyl alcohol and certain dichroic dyes may be used to make films with the ability to polarize light. Other polymers, such as polyethylene terephthalate or polyamides, such as nylon-6, do not exhibit as strong an ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light.

Molecular alignment of a dichroic dye within an optical body made in accordance with the present invention is preferably accomplished by stretching the optical body after the dye has been incorporated into it. However, other methods may also be used to achieve molecular alignment. Thus, in one method, the dichroic dye is crystallized, as through sublimation or by crystallization from solution, into a series of elongated notches that are cut, etched, or otherwise formed in the surface of a film or other optical body, either before or after the optical body has been oriented. The treated surface may then be coated with one or more polymer layers, may be incorporated into a polymer matrix or used in a multilayer structure, or may be utilized as a component of another optical body. The notches may be created in accordance with a predetermined pattern or diagram, and with a predetermined amount of spacing between the notches, so as to achieve desirable optical properties.

In a related embodiment, the dichroic dye may be disposed within one or more hollow fibers or other conduits, either before or after the hollow fibers or conduits are disposed within the optical body. The hollow fibers or conduits may be constructed out of a material that is the same or different from the surrounding material of the optical body.

In yet another embodiment, the dichroic dye is disposed along the layer interface of a multilayer construction, as by sublimation onto the surface of a layer before it is incorporated into the multilayer construction. In still other embodiments, the dichroic dye is used to at least partially backfill the voids in a microvoided film made in accordance with the present invention.

Light Valve Constructions

Having thus described various illustrative polarizing element constructions, FIG. 1 is a perspective view of one illustrative light valve according to the present invention that includes a front polarizing element 10 and a rear polarizing element 20. Front polarizing element 10 has a transmission axis 12, as shown in FIG. 1. Also shown in FIG. 1 is a reference axis 14 and angle θ which is formed between the transmission axis 12 and reference axis 14.

Rear polarizing element 20 is preferably rotated about axis of rotation 24 which is preferably generally parallel to reference axis 14 of polarizing element 10. Rear polarizing element 20 includes an axis of transmission 22 that forms an angle α with the axis of rotation 24. Transmission axis 22 and axis of rotation 24 preferably lie in the plane of rear polarizing element 20. As a result, rotation of rear polarizing element 20 about axis of rotation 24 results in location of rear polarizing element 20 below axis of rotation 24, as indicated by reference numeral 20'. Rotation of rear polarizing element 20 also results in a mirroring of the transmission axis 22 about axis of rotation 24 to a position indicated by reference numeral 22'. As a result, the axis of transmission 22' forms an angle β with the axis of rotation 24, as best seen in FIG. 1.

Figure 2:
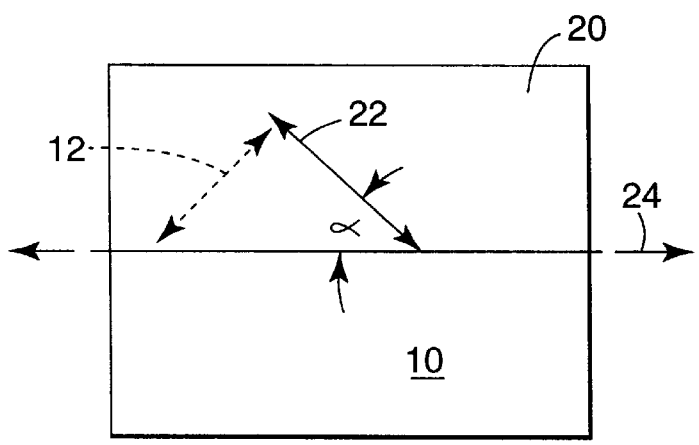
FIG. 2 is a plan view of the light valve of FIG. 1.

It is preferred that the angles θ, α, and β formed between their respective axes of transmission in reference axes are about 45°. By providing the transmission axes with those orientations, the light valve depicted in FIG. 1 can be opened or closed by rotating rear polarizing element 20 about axis of rotation 24. Referring to FIG. 2, which is a plan view of the light valve of FIG. 1, it can be seen that transmission axis 12 of the front polarizing element 10 forms approximately a 90° angle with the transmission axis 22 of rear polarizing element 20. By orienting the axes of transmission 12 and 22 generally orthogonal to each other, a minimum amount of light will be transmitted through the upper half of light valve depicted in FIG. 1, i.e., the light valve will be in the opaque condition.

Figure 3:
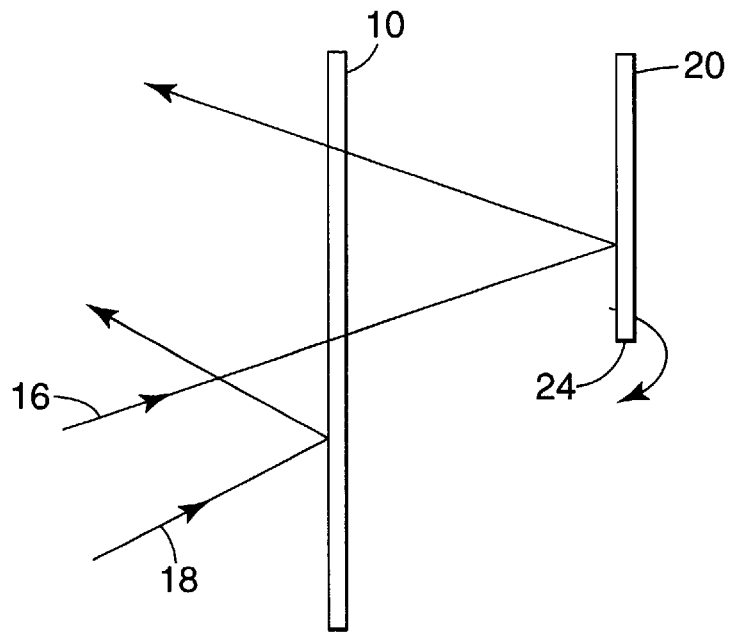
FIG. 3 is a side view of the light valve of FIG. 1 taken along the axis of rotation 24.

FIG. 3 is a side view of the light valve of FIGS. 1 and 2 taken along the axis of rotation 24. This view depicts the effects on light of the light valve when in the state depicted in FIGS. 1 and 2, where the rear polarizing element 20 is located above axis of rotation 24. Light 16 having one polarization orientation is depicted as being transmitted through the front polarizer 10 where it strikes rear polarizer 20. Because light 16 has a polarization orientation that is transmitted through polarizing element 10, it is not transmitted through rear polarizing element 20. Instead, light 16 is reflected from the preferred reflective polarizer of rear polarizing element 20 where it is transmitted back through front polarizing element 10 (assuming its polarization orientation is unchanged). It will, of course, be understood that if rear polarizing element 20 were an absorptive polarizer, light 16 would merely be absorbed by the rear polarizing element 20.

Light 18, which is depicted in FIG. 3 as incident upon front polarizing element 10, is not transmitted through but is, instead, depicted as being reflected from front polarizing element 10 because it has a polarization orientation that is orthogonal to the axis of transmission 12 seen in FIGS. 1 and 2. Again, although it is preferred that front polarizing element 10 be a reflective polarizer, it may also be provided as an absorptive polarizer in which case light 18 would be absorbed by front polarizing element 10. The result is that the front and rear polarizing elements 10 and 20 prevent the transmission of substantially all of the light incident on them because the axes of transmission 12 and 22 are oriented substantially orthogonal to each other.

Figure 4:
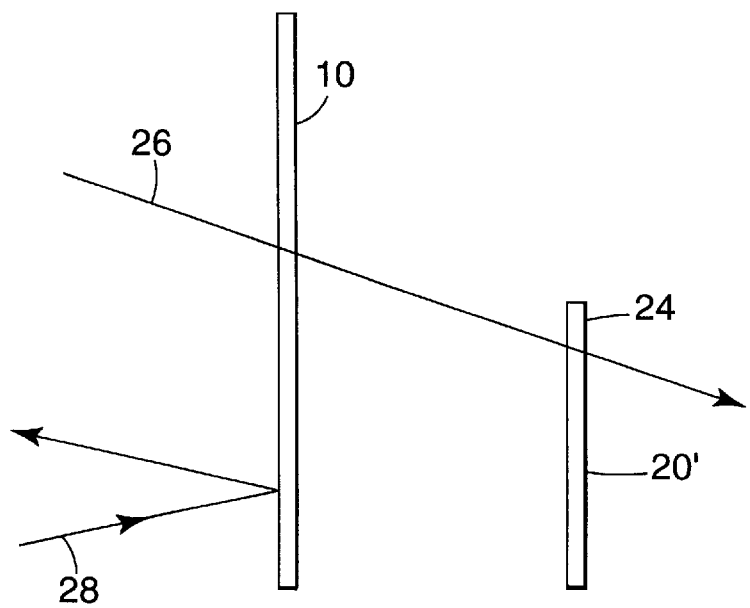
FIG. 4 is a side view of the light valve of FIG. 1 taken along the axis of rotation 24, with the second polarizing element 20' in a lower position.

FIG. 4 is a side view of the light valve of FIG. 1 in which the rear polarizer is depicted in the lower position 20' where the axis of transmission 22' is generally aligned with axis of transmission 12 of the front polarizing element 10. Light 26 having a polarization orientation that is generally aligned with the axis of transmission 12 of front polarizing element 10 is transmitted through the front polarizing element 10 and, because the axis of transmission 22' is aligned with axis of transmission 12, light 26 is also transmitted through the rear polarizing element 20'. Light 28 having an orthogonal polarization orientation to that of light 26 is depicted as being reflected from the surface of front polarizing element 10 (which is preferably, but not necessarily, a reflective polarizer). Because the light valve transmits light having the polarization orientation of light 26, the light valve is considered to be in the transnissive or open state in FIG. 4 (although it will be understood that only about half of the incident light will actually be transmitted due to the polarizing fimction of the polarizing elements 10 and 20.

Although FIGS. 1–4 depict a light valve in which a front polarizing element 10 is paired with a single rear polarizing element 20, it will be understood that a plurality of rear polarizing elements 20 could be provided in the form of a venetian blind or other similar assembly such that rotation of each element 20 about its respective axis of rotation would result in a change in the amount of light transmitted through the light valve. In such an application, it would be preferred that the front polarizing element 10 be provided as a single sheet or film of polarizing material that could be laminated to window glass, etc. Alternatively, front polarizing element 10 could be provided in the form of a shade or other article which could be placed between the window or other opening and the rear polarizing elements 20. If the front polarizing element were removable or movable, the user could raise both front polarizing element 10 and rear polarizing element 20 out of the path of incident light comning through a window or other opening to prevent the polarizing elements 10 and 20 from interfering with the transmission of light through the window or other opening.

If the user desired only to attenuate a portion of the light incident on the window or other opening, front polarizing element 10 could be lowered into place, which would result in limiting the transmission to approximately 50% of incident light, i.e., that light having a polarization orientation generally aligned with axis of transmission 12 in FIG. 1. In addition to reducing the intensity of the transmitted light, another potential advantage is that the front polarizing element may reduce glare caused by light passing through, e.g., a window. Where further reduction in the transmission of light through the window or other opening was desired, rear polarizing element 20 or elements 20 could be lowered and placed in the positions depicted in FIGS. 1–3 to prevent substantially all of incident light from passing through the light valve. Alternately, the rear polarizing elements could be rotated about their respective axes of rotation to allow approximately 50% of incident light to pass through the light valve including front polarizing element 10 and rear polarizing element 20 or elements 20.

Although the axes of transmission for the front polarizing element 10 and rear polarizing element 20 are preferably about 45° off of the axis of rotation 24 about which rear polarizing element 20 is rotated, it will be understood that transmission axes with other orientations could be provided. Deviations from the preferred 45° angular orientation will result in transmission of at least some light when the front and rear polarizing elements 10 and 20 are located such that their axes of transmission 12 and 22 are not orthogonal with respect to each other. The present invention can be broadly characterized, however, in that 180° rotation (see angle φ in FIG. 1) of the rear polarizing element 20 about an in-plane axis of rotation 24 will result in a change between maximum transmission and minimum transmission of incident light, where the maximum and minimums are variable depending on the orientation of the axes of transmission 12 and 22 of the front and rear polarizers 10 and 20.

Perhaps even more broadly, it should be understood that at least one of the axes of transmission 12 and 22 is located at an angle that is greater than about 0 degrees and less than about 90 degrees, i.e., is not parallel with or orthogonal to the axis of rotation 24. As a result, the other polarizing element, regardless of the orientation of its transmission axis, will cross the other axis of transmission by a smaller angle in a first orientation and a larger angle when one of the polarizing elements is rotated about the axis of rotation to a second orientation. That variation between the first and second orientations, i.e., smaller and larger crossing angles, will change the amounts of incident light that are transmitted through the light valve. Where the axes of transmission cross at a smaller angle, the light valve will transmit more incident light and where the transmission axes cross at a larger angle, the light valve will transmit less incident light.

Figure 5:
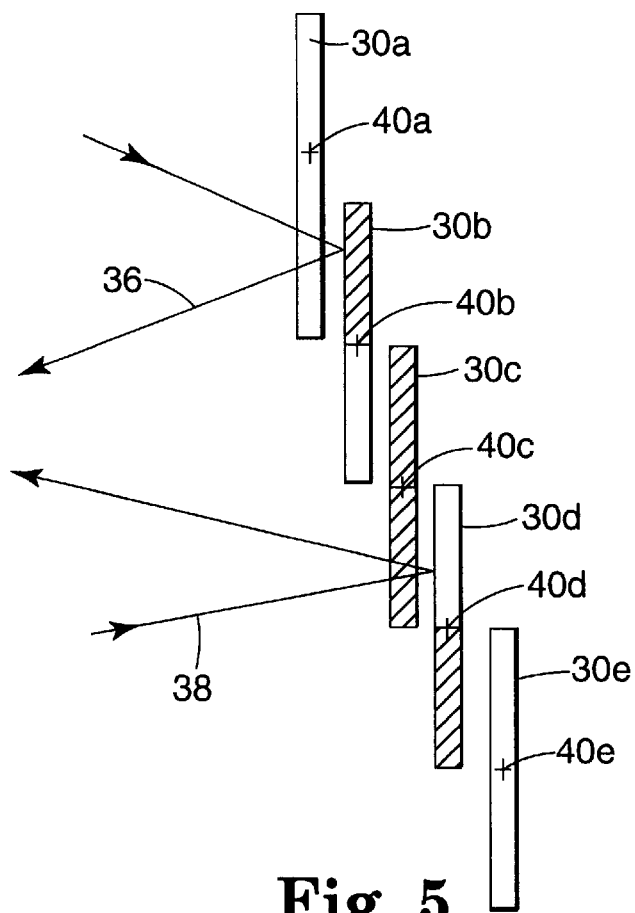
FIG. 5 is a side view of an alternative light valve according to the present invention.

FIG. 5 illustrates an alternate embodiment of a light valve including a plurality of polarizing elements 30*a*, 30*b*, 30*c*, 30*d*, and 30*e* (collectively referred to as polarizing elements 30). Each of the polarizing elements 30 is overlapped by one or more of the adjacent elements 30. For example, a portion of the polarizing element 30*a* is overlapped by polarizing element 30*b* which is, in turn, overlapped by the next polarizing element 30*c*.

Polarizing element 30*c* (which is shaded) along with the shaded portions of polarizing elements 30*b* and 30*d* preferably have transmission axes that are generally aligned with each other, while polarizing elements 30*a* and 30*e* (which are unshaded), as well as unshaded portions of polarizing elements 30*b* and 30*d*, have transmission axes that are generally aligned with each other. It is preferred that the two different sets of aligned axes of transmission (represented by the shaded and unshaded polarizing elements 30) be generally or substantially orthogonal to each other. As discussed above, however, the different sets of transmission axes need not necessarily be generally or substantially orthogonal as other orientations are also anticipated provided that at least some intersection or crossing of the two sets of axes of transmission can be accomplished by rotation of each of the polarizing elements 30 about their respective axes of rotation 40*a*, 40*b*, 40*c*, 40*d*, and 40*e* (collectively referred to as axes of rotation 40).

When the polarizing elements 30 are aligned as depicted in FIG. 5, the light valve is in a substantially closed position, i.e., substantially all of the incident light is reflected from the light valve. For the purposes of this illustration, the polarizing elements 30 are preferably constructed from reflective polarizing materials and, as a result, light that is not transmitted is generally reflected from the polarizing elements 30. If, however, the elements 30 were absorptive polarizers rather than reflective, then the light that is not transmitted would generally be absorbed.

Among the incident light illustrated in FIG. 5, ray 36 has a polarization orientation that is transmitted through unshaded polarizing element 30*a* but is reflected, i.e., not taansmitted, through the shaded overlapping portion of polarizing element 30*b*. Ray 38 is shown as incident upon polarizing element 30*c* and has a polarization orientation that is orthogonal to the polarization orientation of ray 36. As a result, ray 38 is transmitted through the shaded polarizing element 30*c* but is reflected from the unshaded portion of polarizing element 30*d*.

Figure 6:
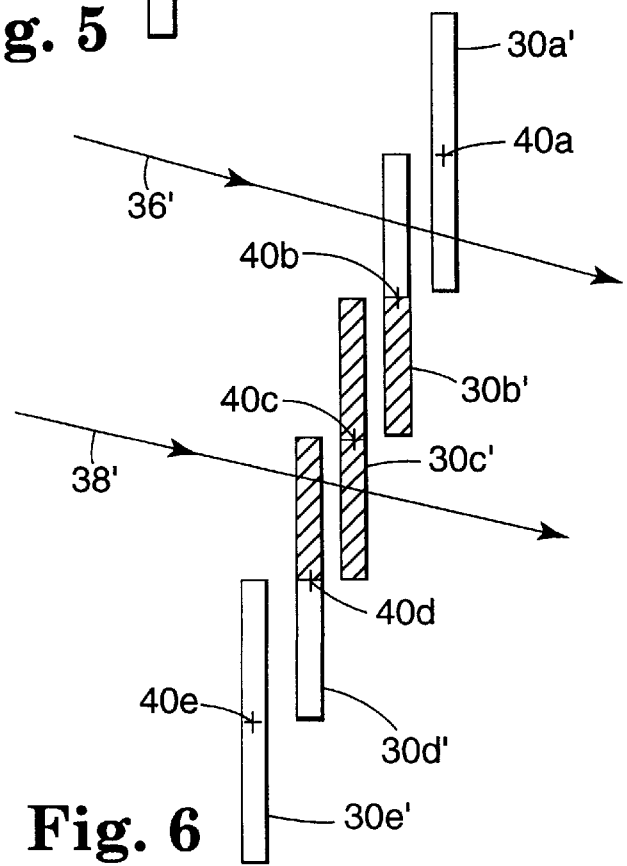
FIG. 6 is a side view of the light valve of FIG. 5 in which the elements 30 have been rotated 180° around their respective axes 40.

Rotation of each of the polarizing elements 30 about 180 degrees around its respective axis of rotation 40 will result in the light valve depicted in FIG. 6 in which the unshaded portions of the rotated polarizing elements 30' are aligned with each other (i.e., overlap each other) while the shaded portions of polarizing elements 30' have axes of transmission that are also aligned with each other. The result of these alignments is that substantially all of the light valve will transmit at least a portion of the incident light. Those portions of the light valve in which the unshaded portions of the polarizing elements 30' are aligned will transmit substantially all of the incident light having a polarization orientation aligned with their axes of transmission. Similarly, those portions of the light valve in which the shaded portions of the polarizing elements 30' are aligned will transmit substantially all of the incident light having a polarization orientation aligned with their axes of transmission.

For example, light 36' having one polarization orientation is transmitted through the unshaded polarizing element 30*a*' and the unshaded overlapping portion of reflective polarizer 30*b*'. Light 38', having a different polarization orientation, is transmitted through the shaded polarizing element 30*c*' and the shaded overlapping portion of polarizing element 30*d*', as shown. As a result, the light valve depicted in FIG. 6 will transmit about 50% of incident light as the unshaded portions of the light valve will transmit light of one polarization orientation while the shaded portions of the light valve will transmit light having another polarization orientation.

A review of the light valve depicted in FIGS. 5 and 6 will show that polarizing elements 30a–30d can be used as a repeating set to cover a desired area. In other words, the polarizing element 30e would form the first polarizing element of the next set, i.e., would correspond to polarizing element 30a located at the top of the light valve depicted in FIGS. 5 and 6. These repeating sets of polarizing elements 30a–30d could be chained together to form a light valve having the desired dimensions.

One advantage of a light valve constructed according to FIGS. 5 and 6 is that the need for a fixed or stationary front polarizing element as described in connection with the embodiment illustrated in FIGS. 1–4 is eliminated, as each of the rotating polarizing elements 30 function as either a front or rear polarizer depending on their orientation relative to the overlapping portions of the polarizing elements 30.

FIGS. 7–10 depict an alternate embodiment of a light valve, according to the present invention, in which front polarizing elements 50a, 50b, and 50c (collectively referred to as front polarizing elements 50) are provided in conjunction with rear polarizing elements 60a and 60b (collectively referred to as rear polarizing elements 60). Each of the front polarizing elements 50 includes an axis of rotation 52a, 52b, and 52c, respectively (collectively referred to as axes of rotation 52), and each of the rear polarizing elements 60 includes an axis of rotation 62a and 62b, respectively (collectively referred to as axes of rotation 62). Each of the front polarizing elements 50 also includes an axis of transmission 54 that forms an angle $\delta$ with the respective axis of rotation 52 for the given front polarizing element 50. Each of the rear polarizing elements 60 defines an axis of transmission 64 which forms an included angle $\epsilon$ with the respective axis of rotation 62 for the given rear polarizing element 60.

It is preferred that the axes of rotation 52 are preferably generally parallel to each other. It is also preferred that the axes of rotation 62 of each of the rear polarizing element 60 are also generally parallel to each other. Furthermore, it is also preferred that axes of rotation 52 are generally parallel to axes of rotation 62, as depicted in FIGS. 8 and 9.

Figure 7:
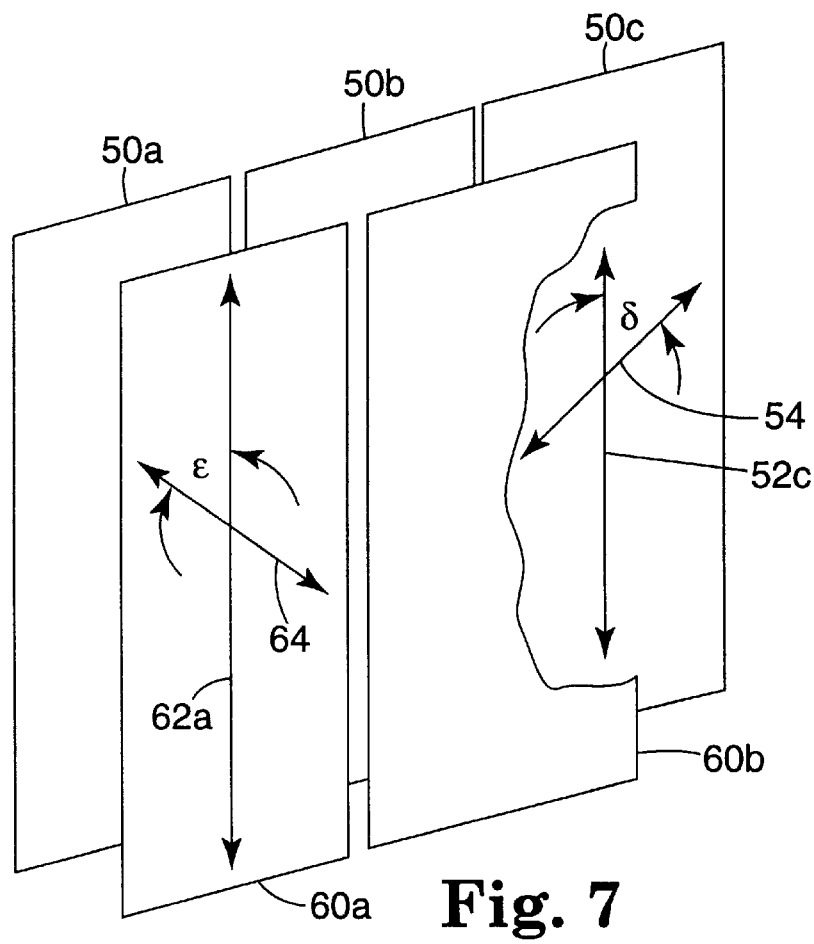
FIG. 7 is a perspective view of an alternate light valve according to the present invention.
Figure 8:
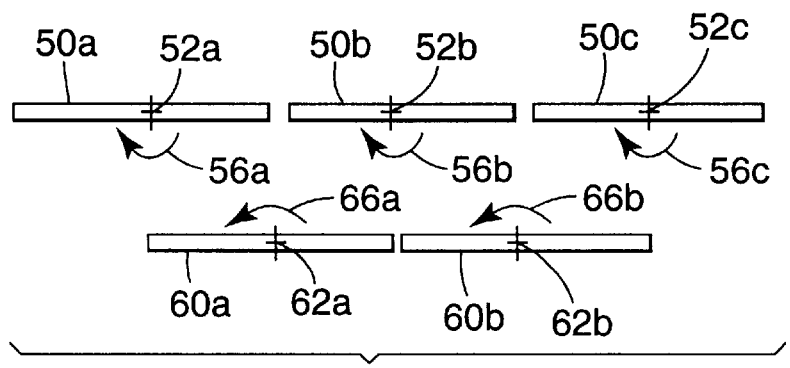
FIG. 8 is a top view of the light valve of FIG. 7 taken along the axes of rotation 52 and 62.
Figure 9:
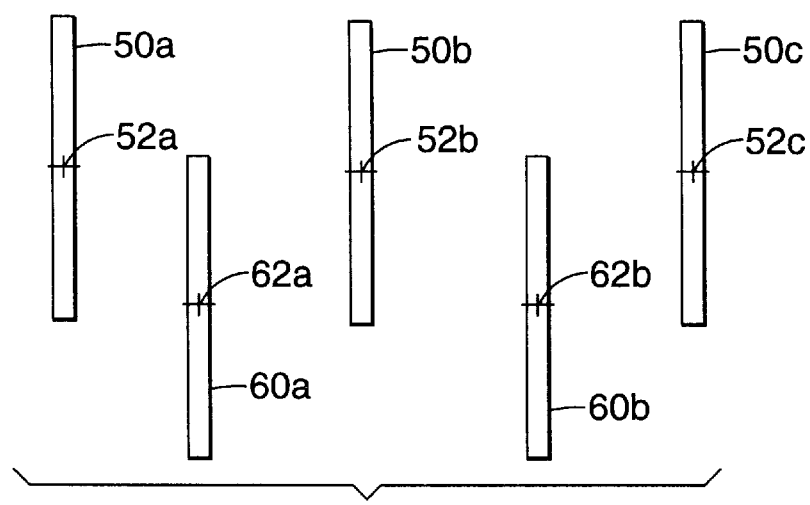
FIG. 9 is a top view of the light valve of FIG. 7 taken along the axes of rotation 52 and 62 after rotation of the elements 50 and 60 about their respective axes.
Figure 10:
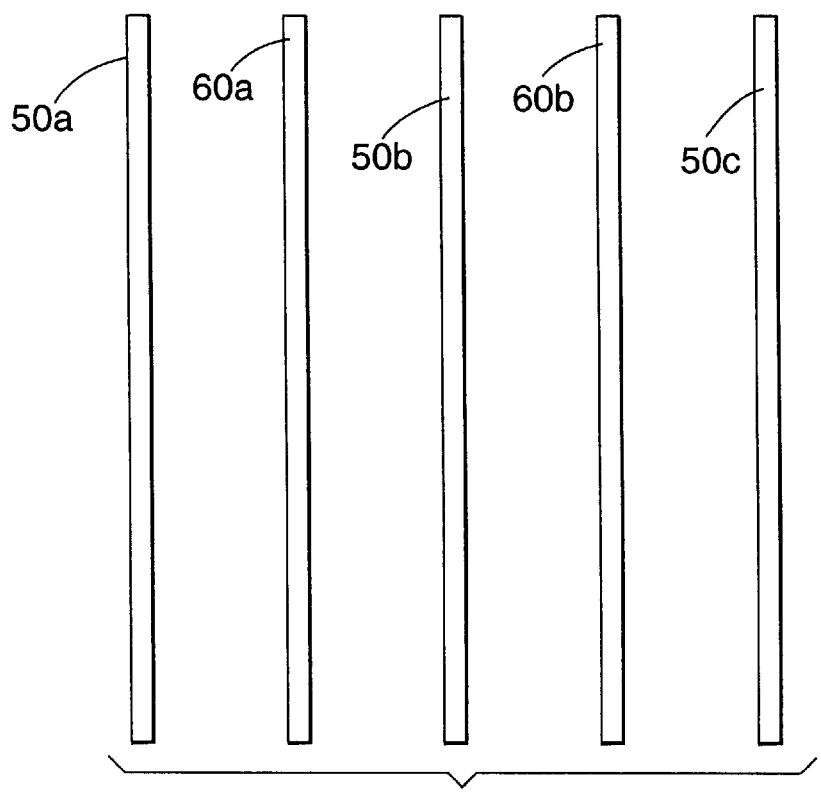
FIG. 10 is a front view of the light valve in the condition depicted in FIG. 9.

By rotating the front polarizing elements 50 and rear polarizing elements 60 about their respective axes of rotation, as shown by directional arrows 56a, 56b, 56c, 66a, and 66b, the polarizing elements 50 and 60 can be oriented in a substantially co-planar relationship, such as that depicted in FIGS. 7 and 8, or can be oriented in the generally parallel relationship best seen in FIGS. 9 and 10 where the polarizing elements 50 and 60 are all generally parallel to each other, thereby allowing at least a portion of light to pass through the light valve without passing through any of the polarizing elements 50 or 60.

Furthermore, where one of the angles $\delta$ or $\epsilon$ forms a 90° angle with the respective axes of rotation and the other of angles $\delta$ and $\epsilon$ is generally at about zero, i.e., the transmission axis is generally parallel to the respective axis of rotation, the front and rear polarizing elements 50 and 60 can be manipulated between a closed position and an open position. In the closed position, substantially none of the incident light would pass through both a front polarizing element 50 and a rear polarizing element 60. In the open position, at least some of the light would pass through the front and rear polarizers 50 and 60 only when one of the front or rear polarizer elements 50 and 60 were rotated 90° from the positions depicted in FIG. 8. In other words, if rear polarizing elements 60 were each rotated 90°, a substantial portion of the light passing through front polarizing elements 50 would pass between rear polarizing elements 60 and be transmitted through the light valve.

If, however, angles $\delta$ and $\epsilon$ were each approximately 45° off of their respective axes of rotation 52 and 62, then rotation of the front polarizing elements 50 and rear polarizing elements 60 can result in transmission of at least some incident light when the front and rear polarizing elements 50 and 60 are oriented in a generally co-planar relationship, as depicted in FIG. 8. For example, if front polarizing elements 50 were held stationary, as depicted in FIG. 7, while rear polarizing elements 60 were rotated about 180° around their respective axes of rotation 62, then the axes of transmission 54 and 64 would be generally aligned and would allow light having a polarization orientation substantially aligned with those axes of transmission to pass through the front polarizing elements 50 as well as the rear polarizing elements 60.

In contrast, the axes of transmission 54 and 64 would be generally orthogonal to each other if angles $\delta$ and $\epsilon$ are both approximately 45° and the rear polarizing elements 60 were rotated about 180° around their respective axes of rotation 62. As a result, light having one polarization orientation would be reflected by front polarizing elements 50, while light having the orthogonal polarization orientation would be reflected (or absorbed) by rear polarizing elements 60 resulting in the transmission of substantially no light through the light valve. It will be understood that the light could alternately be absorbed rather than reflected depending on the nature of the polarizing materials used in the polarizing elements.

Figure 11:
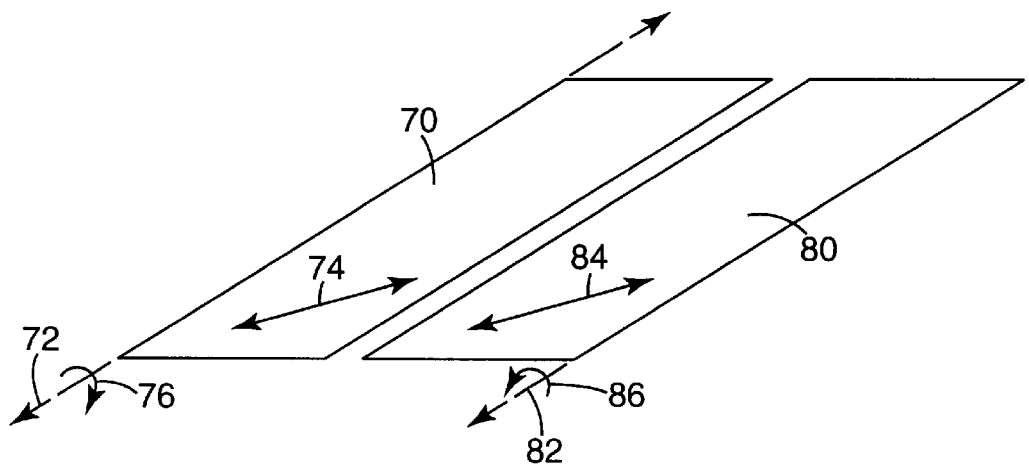
FIG. 11 is a perspective view of an alternate light valve according to the present invention.
Figure 12:
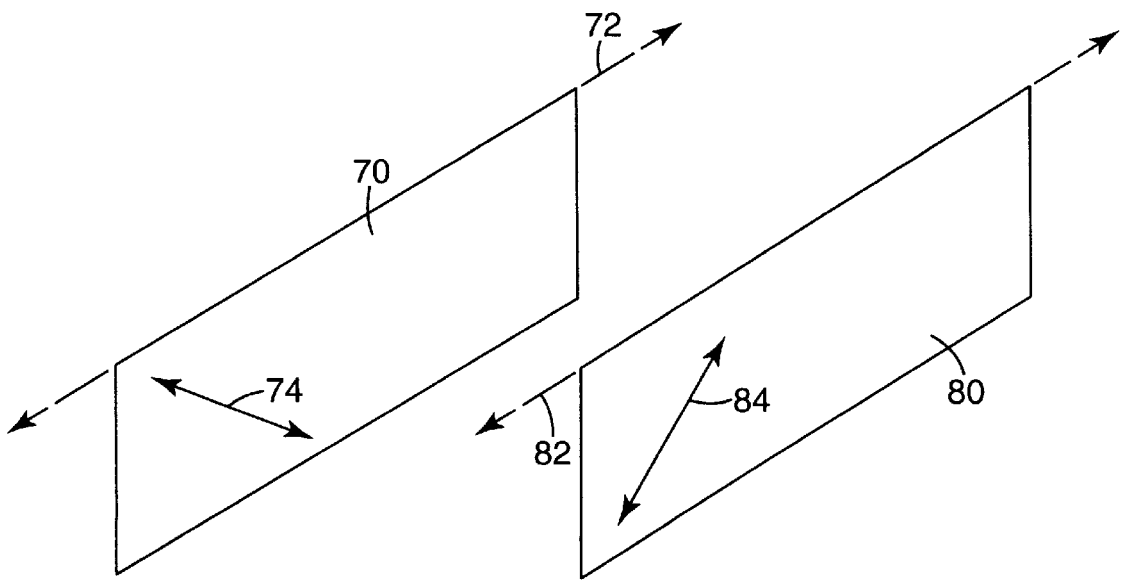
FIG. 12 is a perspective view of the light valve of FIG. 11 after rotation of the elements about their respective axes of rotation.

Another alternative light valve according to the present invention is depicted in FIGS. 11 and 12. The light valve includes polarizing elements 70 and 80. Polarizing element 70 rotates about an axis of rotation 72 and includes an axis of transmission 74 which defines the polarization orientation of light transmitted through polarizing element 70. Polarizing element 80 rotates about an axis of transmission 82 and includes a transmission axis 84 which also defines the polarization orientation of light transmitted through polarizing element 80.

When polarizing element 70 is rotated about axis of rotation 72 in direction 76 and polarizing element 80 is rotated about axis of rotation 82 in direction 86, the resulting orientation of the polarizing elements 70 and 80 is depicted in FIG. 12. In those light valves in which transmission axis 74 in polarizing element 70 is oriented at an angle of about 45° with axis of rotation 72 and in which axis of transmission 84 of polarizing element 80 is oriented at an angle of 45° with axis of rotation 82, the light valve of FIGS. 11 and 12 will block substantially all incident light directed through both polarizing element 70 and polarizing element 80 (assuming axes of rotation 72 and 82 are generally parallel to each other). Substantially all of the incident light is blocked when polarizing elements 70 and 80 are located in the orientation depicted in FIG. 12, because when the respective axes of transmission are oriented at about 45° with the respective axes of rotation, then the axis of transmission 74 is generally orthogonal to axis of transmission 84 when the polarizing elements 70 and 80 are in the orientation depicted in FIG. 12.

Figure 13:
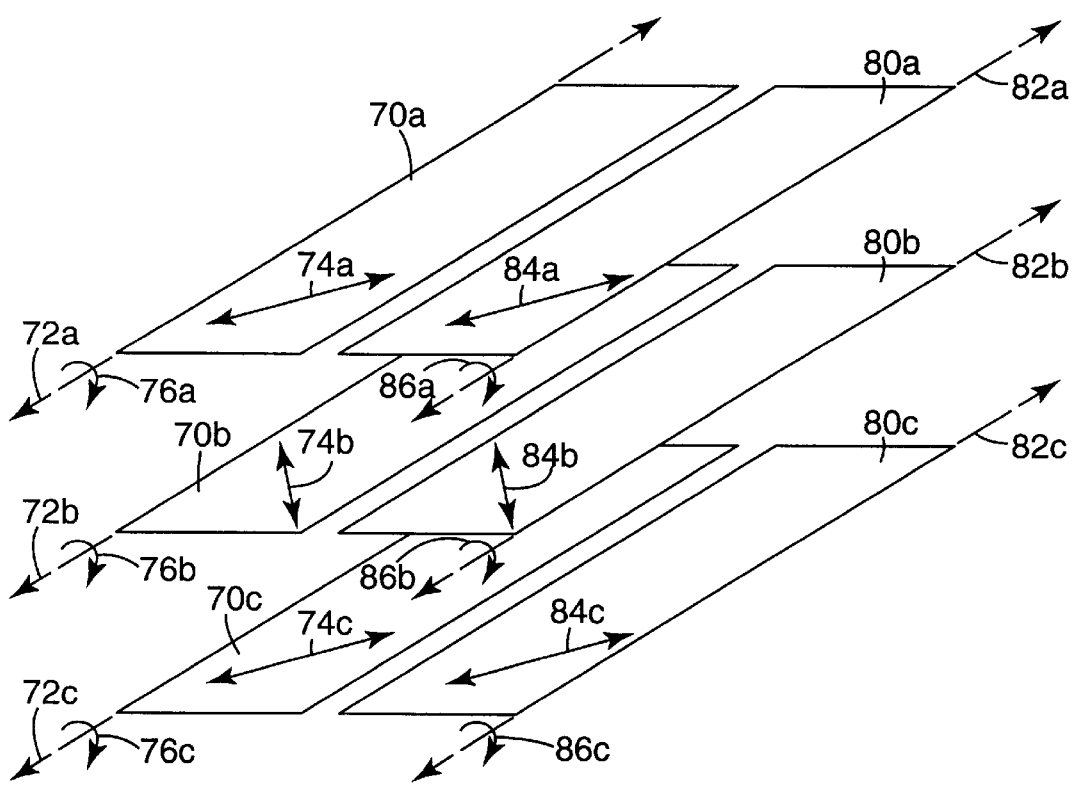
FIG. 13 is an alternate embodiment of a light valve according to the present invention.

FIG. 13 depicts an extension of the light valve of FIGS. 11 and 12 which includes a plurality of pairs of polarizing elements 70a/80a, 70b/80b, and 70c/80c. Each of the polarizing elements 70a, 70b, and 70c (collectively referred to as polarizing elements 70) is rotatable about an axis of rotation 72a, 72b, and 72c, respectively. The axes of rotation 72a, 72b, and 72c will be collectively referred to as axes of rotation 72. Similarly, each of the polarizing elements 80a, 80b, and 80c (collectively referred to as polarizing elements 80) is rotatable about an axis of rotation 82a, 82b, and 82c, respectively. The axes of rotation 82a, 82b, and 82c will be collectively referred to below as axes of rotation 82. Each of the polarizing elements 70 includes an axis of transmission 74a, 74b, and 74c (collectively referred to as axes of transmission 74). Likewise, each of the polarizing elements 80 includes an axis of transmission 84a, 84b, and 84c (collectively referred to as axes of transmission 84).

As with the light valve of FIGS. 11 and 12, it is preferred that each pair of polarizing elements 70 and 80 include respective axes of transmission 74 and 84, that are substantially aligned with each other and which form angles of 45° (or about 45°) with the respective axis of rotation 72 or 82. As a result, rotation of each of the polarizing elements 70 and 80 of about 90° around the axes of rotation 72 and 82 in the directions depicted by arrows 76 and 86 will result in orientation of the axes of transmission 74 and 84 in a generally orthogonal state where substantially all of the incident light will be prevented from passing through the light valve.

In the light valve depicted in FIG. 13, it is preferred that the axes of transmission 74 in polarizing elements 70 that are adjacent to each other (vertically in FIG. 13) be oriented generally orthogonal to each other. It is also preferred that each of the axes of rotation 72 of polarizing elements 70 be generally parallel to each other. As a result, the axis of transmission 74a for polarizing element 70a is preferably oriented generally orthogonal to the axis of transmission 74b of polarizing element 70b (when viewing down through the stack of polarizing elements 70). Likewise, it is preferred that axis of transmission 74b be oriented generally orthogonal to axis of transmission 74c for polarizing element 70c. The same relationships also are preferably present in the axes of transmission for polarizing elements 80 as depicted in FIG. 13.

Figure 14:
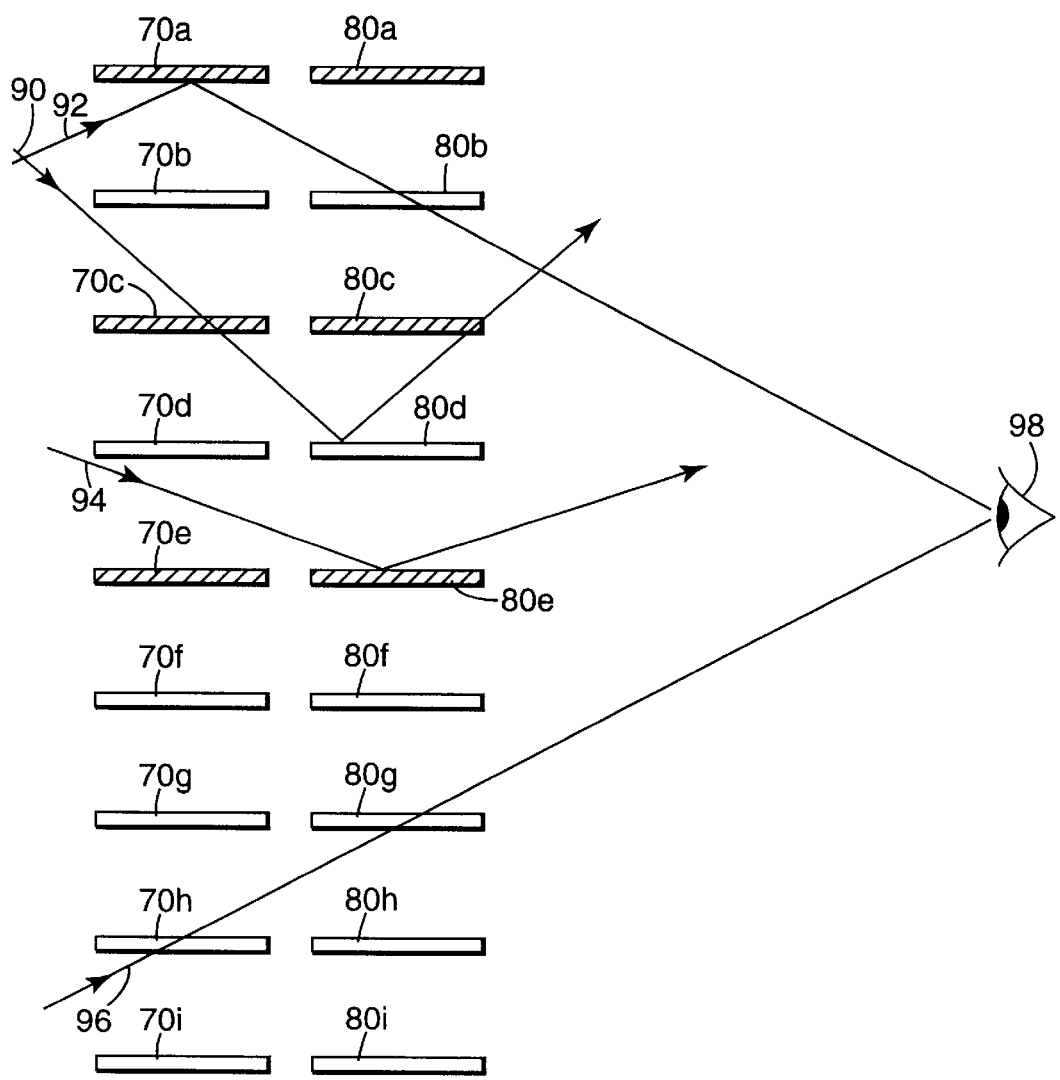
FIG. 14 is a side view of the light valve of FIG. 13, including additional elements 70 and 80 and taken along the axes of rotation 72 and 82 of the elements 70 and 80.

One potential advantage for light valves similar to those depicted in FIG. 13 is illustrated in FIG. 14 which, in addition to polarizing element pairs 70a/80a, 70b/80b, and 70c/80c, includes additional pairs of polarizing elements 70d/80d, 70e/80e, 70f/80f, 70g/80g, 70h/80h, and 70i/80i. Those polarizing elements 70 and 80 having an axis of transission generally aligned with the axes of transmission 74a and 84a of FIG. 13 are depicted as shaded polarizing elements in FIG. 14. Those polarizing elements 70 and 80 having axes of transmission that are generally aligned with axes of transmission 74b and 84b, as depicted in FIG. 13, are unshaded in FIG. 14. In other words, polarizing elements 70b/80b, 70d/80d, and 70f/80f through 70i/80i all have axes of transmission that would be generally aligned with axes of transmission 74b and 84b of FIG. 13.

As depicted in FIG. 14, light that is incident upon the array of polarizing elements 70 and 80 at larger angles (with respect to the planes formed by each of the transmission axes and respective axes of rotation) will be reflected at least once by the polarizing elements 70 and 80 where the axes of transmission of vertically adjacent polarizing elements (e.g., 70a and 70b) are generally orthogonal to each other.

In other words, light 90, which has a polarization orientation that is transmitted by shaded polarizing element 70c, will be reflected by unshaded polarizing element 80d, as shown in FIG. 14. Similarly, light 92, which has a polarization orientation that is not transmitted by shaded polarizing element 70a, is transmitted by polarization orientation of unshaded polarizing element 80b and, as a result, is visible by an observer 98. Likewise, light 94, which has a polarization orientation that is not transmitted by shaded polarizing element 80e, would be reflected from that element and it would be allowed to enter into the area occupied by observer 98. The end effect of alternating axes of transmission between adjacent pairs of polarizing element 70 and 80 is that the view of an observer 98 upwards would be restricted where the path of light would pass through two polarizing elements having orthogonal axes of transmission, e.g., 70a and 80b. The actual angles at which the view of the observer 98 would be obstructed would vary on the spacing and size of the polarizing elements 70 and 80.

In the lower section of the light valve of FIG. 14, the axes of transmission of each pair of polarizing elements 70 and 80 is aligned such that the view of an observer 98 would not be restricted, and light represented by ray 96 from the lower portion or quadrant would be visible.

It will be understood that the use of alternating axes of transmission in a light valve similar to that depicted in FIG. 13 can be manipulated to allow for viewing in a desired quadrant or allow a view to be blocked as desired. For the light valve depicted in FIG. 14, the observer 98 has a view that is blocked in the upward direction but not in the lower direction. It will be understood that the alternative could be provided, i.e., the observer's view could be blocked in the downward direction as opposed to the upward direction. Furthermore, the view of the observer 98 could be blocked to a narrow range of angles by providing a light valve in which all of the polarizing elements were arranged as elements 70a/80a through 70f/80f, i.e., in which vertically adjacent polarizing elements have orthogonal axes of transmission.

Figure 18:
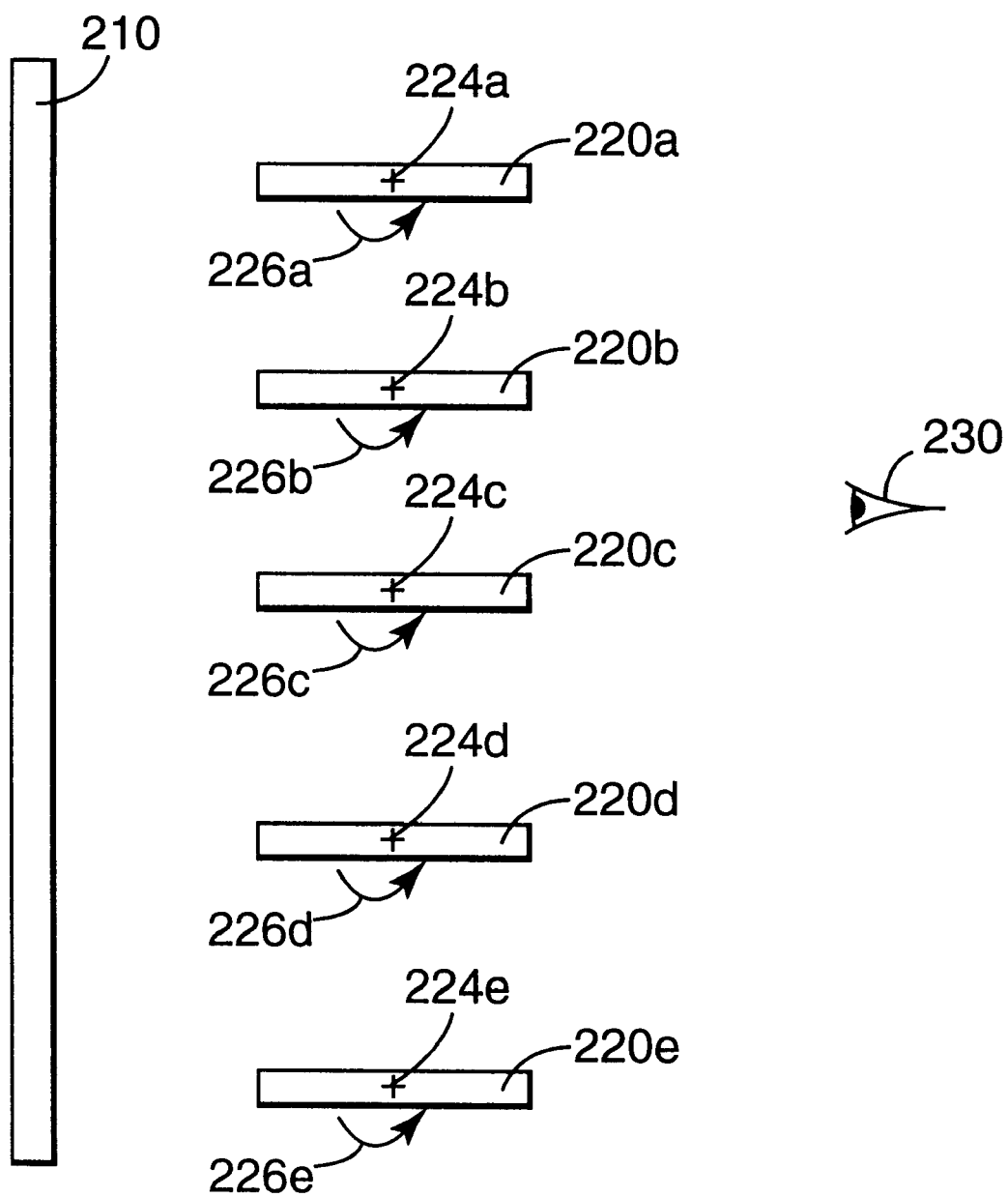
FIG. 18 is a side view of an alternate light valve according to the present invention.

In yet another variation, the same effects of restricting the view of an observer 230 is depicted in FIG. 18. Although similar to the light valve of FIGS. 1–4 which depict a fixed or stationary polarizing element in combination with a rotating polarizing element that rotates between two orientations that are preferably 180 degrees apart, FIG. 18 illustrates a light valve in which the rear polarizing elements rotate more than 180 degrees. The light valve of FIG. 18 includes a fixed or stationary front polarizing element 210 and a plurality of rear polarizing elements 220a through 220e (collectively referred to as polarizing elements 220). Each of the rear polarizing elements 220 rotates about an in-plane axis of rotation 224 as indicated by arrow 226. It is preferred that the polarizing elements 220 are mounted such that they can rotate 360 degrees around the axis of rotation 224. It is also preferred that the transmission axes (not shown) of the front polarizing element 210 and the rear polarizing elements 220 form included angles of about 45 degrees with the axes of rotation 224.

One advantage of allowing 360 degree rotation of the rear polarizing elements 220 is that the view of an observer 230 can be limited in either the upward direction or the downward direction when the polarizing elements 220 are not coplanar with the front polarizing element 210, e.g., as shown in FIG. 18. Those variations in viewing range can be changed by rotation of the polarizing elements 220 such that the axes of transmission of the polarizing elements 210/220 cross or align when viewed by the observer 230.

Figure 15:
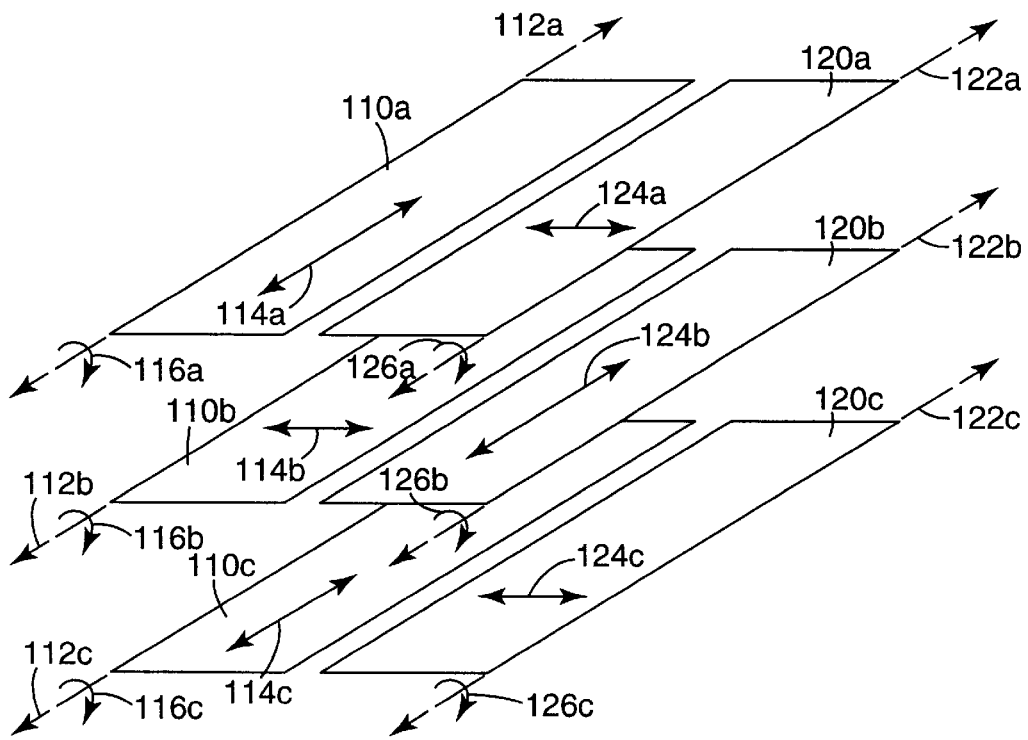
FIG. 15 is a perspective view of an alternate light valve according to the present invention.
Figure 16:
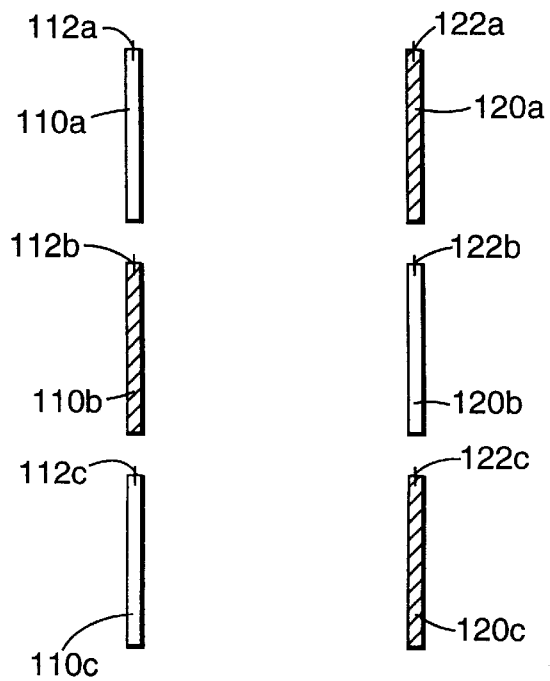
FIG. 16 is a side view of the light valve of FIG. 15 taken along the axes of rotation 112 and 122 of the elements 110 and 120.
Figure 17:
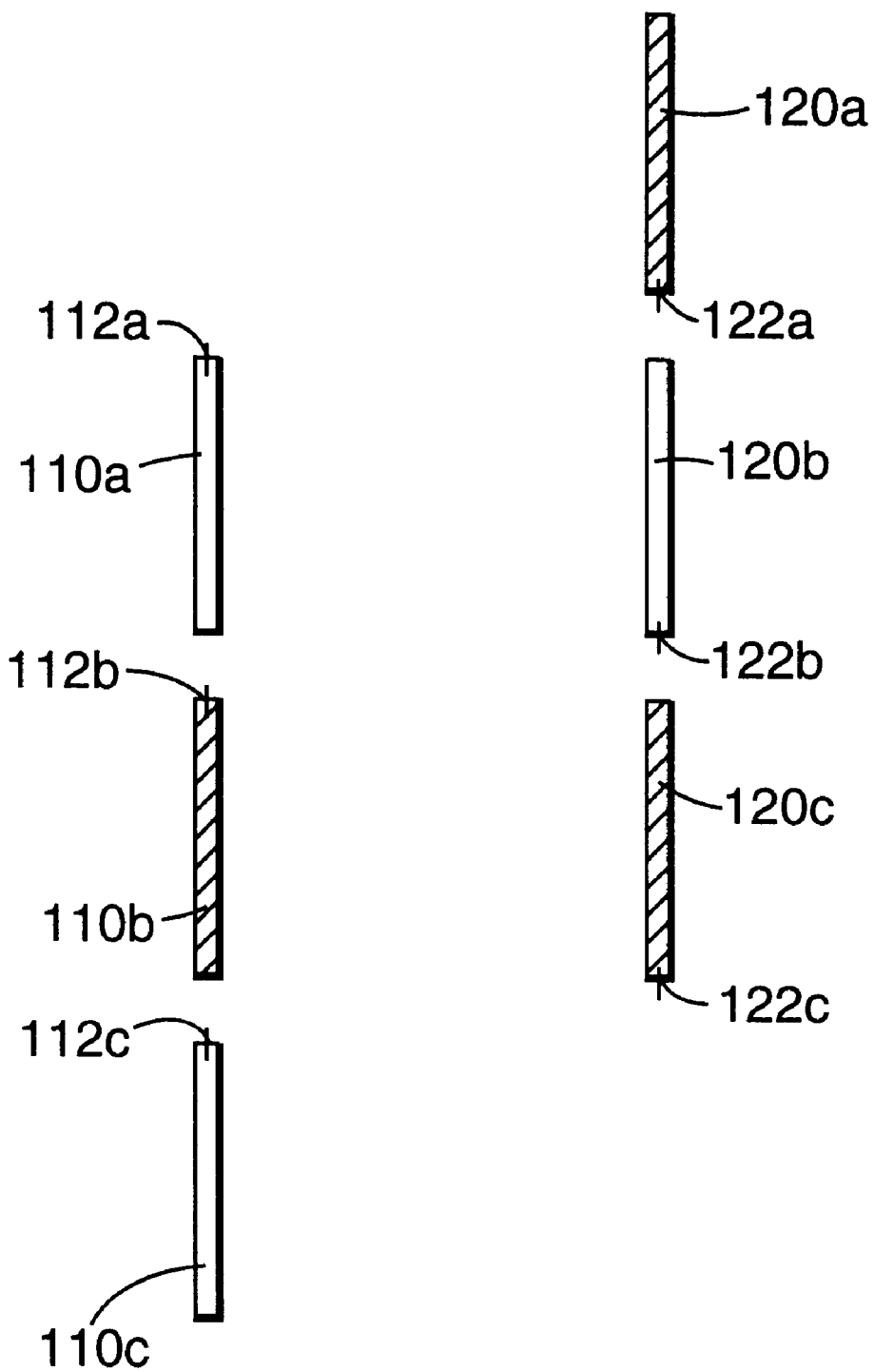
FIG. 17 is a side view of the light valve of FIG. 15 taken along the axes of rotation 112 and 122 of the elements 110 and 120, where elements 120 rotate opposite from the direction depicted in FIG. 15.

FIGS. 15–17 depict an alternate embodiment of a light valve according to the present invention which, although similar to the light valve of FIGS. 13 and 14, does include differences which affect its properties as described below. The light valve of FIG. 15 includes pairs of polarizing elements 110a/120a, 110b/120b, and 110c/120c (collectively referred to as polarizing elements 110 and polarizing elements 120). Each of the polarizing elements 110 rotates about an axis of rotation 112a, 112b, and 112c (collectively referred to as axes of rotation 112). That rotation is preferably in directions 116a, 116b, and 116c as depicted in FIG. 15. Similarly, each of the polarizing elements 120 rotates about its respective axis of rotation 122a, 122b, and 122c (collectively referred to as axes of rotation 122). The direction of rotation is preferably in the direction 126a, 126b, and 126c as depicted in FIG. 15.

In contrast to the light valve depicted in FIGS. 13 and 14, the light valve of FIG. 15 includes polarizing elements 110 and 120 that have axes of transmission that are either generally parallel or orthogonal to the axis of rotation f or the given polarizing element 110/120. For example, polarizing element 110a has an axis of transmission 114a that is preferably substantially parallel to axis of rotation 116a. Polarizing element 120a preferably has an axis of transmission 124a that is generally orthogonal or transverse to axis of rotation 122a.

Moving vertically down the light valve, polarizing element 110b preferably has an axis of transmission 114b that is generally orthogonal or transverse to its axis of rotation 112b. Because the axes of rotation 112a and 112b are preferably generally parallel to each other, the axes of transmission 114a and 114b are generally orthogonal to each other.

Turning to polarizing element 120b, it preferably has an axis of transmission 124b that is generally parallel to its axis of rotation 122b. Because the axes of rotation 122a and 122b are preferably generally parallel to each other, axes of transmission 124a and 124b are preferably generally orthogonal or transverse to each other. The axes of transmission 114b/124b of polarizing element 110b and polarizing element 120b are also preferably generally transverse to each other and generally orthogonal to the axes of transmission 114a and 124a, respectively, of polarizing elements 110a and 120a.

Where the axes of transmission in each pair of polarizing elements 110/120 are oriented either parallel or orthogonal to the axes of rotation as depicted in FIG. 15, the light valve can be moved between a transmission state, such as that depicted in FIG. 15, to an opaque or blocking state, which is depicted in FIG. 16. That movement is typically effected by rotating each of the polarizing elements 110 about 90 degrees around their respective axes of rotation 112 in the directions indicated by arrows 116a–116c. Similarly, each of the polarizing elements 120 is rotated about 90 degrees around their respective axes of rotation 122 in the directions indicated by arrows 126a–126c.

In the end view of FIG. 16 taken along axes of rotation 112 and 122 of FIG. 15, it can be seen that after rotation each of the polarizing elements 110 is generally aligned or located in front of a polarizing element 120. Those polarizing elements 110/120 that have an axis of transmission generally orthogonal or transverse to its respective axis of rotation are depicted as shaded elements 110 and 120 in FIG. 16. Those polarizing elements 110/120 having axes of transmission generally parallel to their respective axes of rotation 112 and 122 are depicted as unshaded in FIG. 16.

The result of orienting the polarizing elements 110/120 as shown in FIG. 16 is that light having any given polarization orientation will be reflected by the polarizing elements 110/120 such that transmission through the light valve will generally be prevented regardless of the polarization orientation of the incident light.

FIG. 17 depicts the result of rotating each of the polarizing elements 120 about 90 degrees around their respective axes of rotation in the direction opposite to directions 126a–126c as indicated in FIG. 15. As with FIG. 16, the shaded polarizing elements 110/120 are those in which the axis of transmission is generally orthogonal or trnsverse to the axis of rotation for that polarizing element while the unshaded polarizing elements 110/120 are those in which the axis of transmission is generally parallel to the axis of rotation of that polarizing element.

The result of rotating polarizing elements 120 in a direction opposite to that indicated by arrows 126a–126c in FIG. 15 is general alignment of the axes of transmission between each pair of front and rear polarizing elements 110/120. The result is that, at least for normal light, the light valve will transmit approximately 50% of incident light (assuming such light has a random polarization orientation). In other words, light passing through polarizing element 110a, which has an axis of transmission that is generally parallel to axis of rotation 112, will also generally be transmitted through polarizing element 120b, which has an axis of transmission that is parallel to (or generally parallel to) its axis of rotation 122b (assuming that axis of rotation 112a is generally parallel to axis of rotation 122b). Similarly, light having a polarization orientation that is transmitted through polarizing element 110b will also be transmitted through polarizing element 120c assuming the axes of rotation 112b and 122c are generally parallel to each other.

Figure 19:
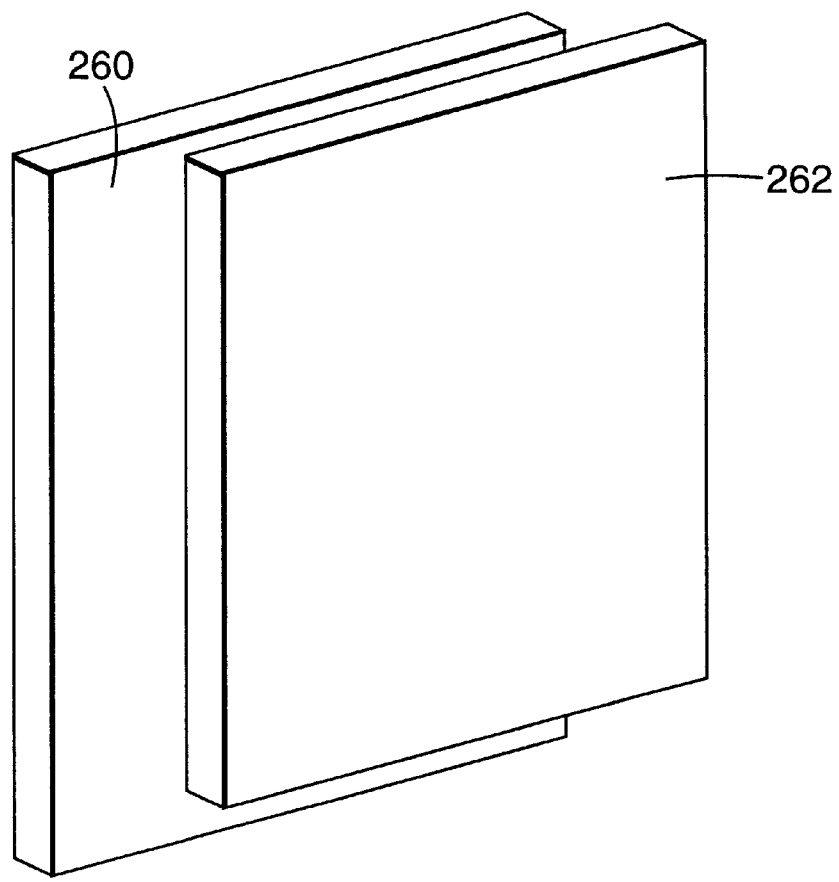
FIG. 19 is a schematic diagram of a window with a light valve according to the present invention.
Figure 20:
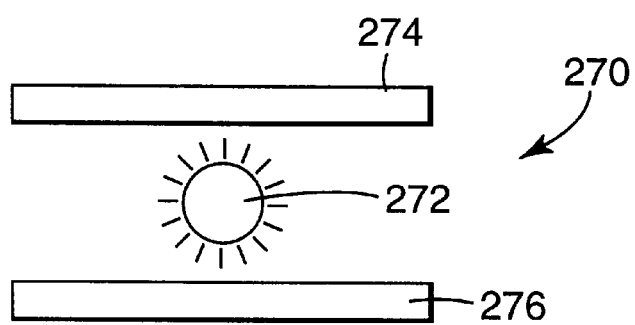
FIG. 20 is a schematic diagram of a luminaire including a light valve according to the present invention.
Figure 21:
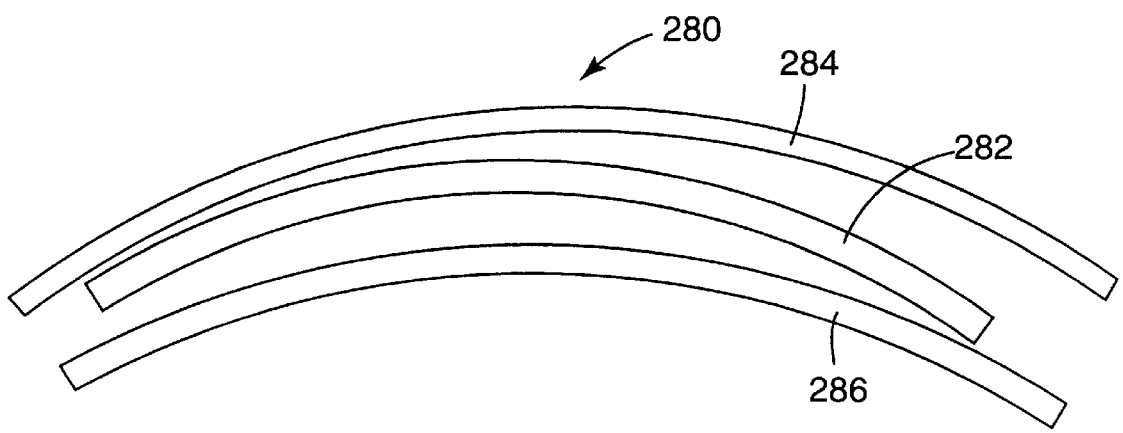
FIG. 21 is a schematic diagram of a skylight including a light valve according to the present invention.

The light valves according to the present invention may be used in many different applications to control the transmission of light. Some more specific examples are, however, depicted in FIGS. 19–21 (although it should be understood that other applications may also be envisioned). FIG. 19 depicts a window 260 including a light valve 262 according to the present invention. FIG. 20 depicts a luminaire 270 including a light source 272 and a pair of opposing light valves 274 and 276 constructed according to the present invention. FIG. 21 is a partial cross-sectional view of a skylight 280 including a light valve 282 located between two panes 284/286 of glass or another light transmnissive material.

The patents, patent documents, and publications cited herein are incorporated by reference in their entirety, as if each were individually incorporated by reference. Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof.

What is claimed is:

1. A polarizing element comprising:
    an infrared selective material comprising at least one of an infrared absorptive material and an infrared reflective material; and
    a reflective polarizer comprising first and second materials, at least one of the first and second materials being birefringent, wherein a refractive index difference between the first and second materials for light having a first polarization orientation is large enough to substantially reflect the light having the first polarization orientation, and further wherein a refractive index difference between the first and second materials for light having a second polarization orientation is small enough to substantially transmit the light having the second polarization orientation.

2. A polarizing element according to claim 1, wherein the first and second materials are polymers.

3. A polarizing element according to claim 1, wherein the second material is disposed within the first material, and further wherein the light having the first polarization orientation is diffusely reflected from the reflective polarizer.

4. A polarizing element according to claim 1, wherein the infrared selective material is laminated to the reflective polarizer.

5. A polarizing element according to claim 1, further comprising an absorptive polarizing material.

6. A polarizing element according to claim 5, wherein the absorptive polarizing material comprises a dichroic dye.

7. A polarizing element according to claim 6, wherein the second material is disposed within the first material, and further wherein the light having the first polarization orientation is diffusely reflected from the reflective polarizer.

8. A polarizing element according to claim 7, wherein the dichroic dye is disposed within the first material.

9. A polarizing element according to claim 1, wherein the reflective polarizer comprises a diffusely reflective polarizer that diffusely reflects the light having the first polarization orientation, and wherein the polarizing element further comprises a specularly reflective polarizer comprising third and fourth materials in different layers within the specularly reflective polarizer, at least one of the third and fourth materials being birefringent, wherein a refractive index difference between the third and fourth materials for light having a first polarization orientation is large enough to substantially specularly reflect the light having the first polarization orientation, and further wherein a refractive index difference between the third and fourth materials for light having a second polarization orientation is small enough to substantially transmit the light having the second polarization orientation.

10. A polarizing element according to claim 9, wherein diffusely reflective polarizer is located on one side of the inked selective material, and further wherein the specularly reflective polarizer is located on an opposite side of the infrared selective material.

11. A polarizing element according to claim 9, wherein the second material in the diffusely reflective polarizer is disposed within the first material, and further wherein the specularly reflective polarizer comprises the third and fourth materials in different layers within the specularly reflective polarizer.

* * * * *

UNITED STATES PATENT AND TRADEMARK OFFICE
CERTIFICATE OF CORRECTION

PATENT NO. : 6,185,039 B1
DATED : February 6, 2001
INVENTOR(S) : Richard C. Allen, Gregg A. Hietpas, Jon E. Stickod, and John A. Wheatley It is certified that error appears in the above-identified patent and that said Letters Patent is hereby corrected as shown below:

Column 1,
Line 18, "trnsmission" should read -- transmission --.

Column 2,
Line 11, "infred" should read -- infrared --.
Line 19, "luninaires" should read --luminaires --
Line 32, "firther" should read -- further --.
Line 39, "diffuisely" should read -- diffusely --.

Column 3,
Line 20, "frrther" should read -- further --.

Column 5,
Line 28, "diffluse" should read -- diffuse --.
Line 31, "defmed" should read -- defined --.

Column 6,
Line 22,"081402,041" sholud read -- 08/402,042 --.
Line 36,"diffuisely" should read -- diffusely --.

Column 7,
Line 30, "t ranssion" should read -- transmission --.
Line 31, "defme" should read -- define --.

Column 10,
Line 9, "usefull"should read -- useful --.
Line 49, "frther" should read -- further --.
Line 66, "traismissivity" should read -- transmissivity --.

Column 11,
Line 46, "dicbroic" should read -- dichroic --.

Column 12,
Line 10, "diff-usely" should read -- diffusely --.

Column 14,
Line 61, "diff-usely" should read -- diffusely --.

UNITED STATES PATENT AND TRADEMARK OFFICE
CERTIFICATE OF CORRECTION

PATENT NO. : 6,185,039 B1
DATED : February 6, 2001
INVENTOR(S) : Richard C. Allen, Gregg A. Hietpas, Jon E. Stickrod, and John A. Wheatley It is certified that error appears in the above-identified patent and that said Letters Patent is hereby corrected as shown below:

Column 16,
Line 56, "transnissive" should read -- transmissive --.
Line 59, "fimction" should read -- function --.

Column 18,
Line 37, "taansmitted" should read -- transmited --.

Column 24,
Line 6, "trnsverse" should read -- transverse --.
Line 40, "transmnissive" should read -- transmissive --.

Signed and Sealed this

Ninth Day of October, 2001

*Attest:*

NICHOLAS P. GODICI
*Attesting Officer*  *Acting Director of the United States Patent and Trademark Office*